US012602839B2

(12) United States Patent
    Chuah

(10) Patent No.:  US 12,602,839 B2
(45) Date of Patent:      Apr. 14, 2026

(54) SYSTEMS AND METHODS FOR RETRIEVING INFORMATION ASSOCIATED WITH CONTENTS OF A CONTAINER USING AUGMENTED REALITY

(71) Applicant: ResMed Asia Pte. Ltd., Singapore (SG)

(72) Inventor: Teong Hong Chuah, Singapore (SG)

(73) Assignee: ResMed Asia Pte. Ltd., Singapore (SG)

( * ) Notice: Subject to any disclaimer, the term of this patent is extended or adjusted under 35 U.S.C. 154(b) by 248 days.

(21) Appl. No.: 18/262,727

(22) PCT Filed: Jan. 28, 2022

(86) PCT No.: PCT/IB2022/050741
     § 371 (c)(1),
     (2) Date: Jul. 25, 2023

(87) PCT Pub. No.: WO2022/162594
     PCT Pub. Date: Aug. 4, 2022

(65) Prior Publication Data
     US 2025/0005805 A1      Jan. 2, 2025

Related U.S. Application Data

(60) Provisional application No. 63/142,839, filed on Jan. 28, 2021.

(51) Int. Cl.
     *G06T 11/00*        (2006.01)
     *G06V 20/20*        (2022.01)
     (Continued)

(52) U.S. Cl.
     CPC .............. *G06T 11/00* (2013.01); *G06V 20/20* (2022.01); *G06V 20/40* (2022.01); *G09B 5/065* (2013.01);
     (Continued)

(58) Field of Classification Search
     CPC . G06T 11/00; G06T 2200/24; G06T 2210/41; G06V 20/20; G06V 20/40; G09B 5/065; G09B 5/062
     See application file for complete search history.

(56) References Cited

U.S. PATENT DOCUMENTS

| | | | |
|---|---|---|---|
| 9,626,712 B1 * | 4/2017 | Shakes ............... | G06Q 10/0832 |
| 2013/0278635 A1 | 10/2013 | Maggiore | |
| 2021/0133450 A1 * | 5/2021 | Nakayama ............. | G06V 10/22 |

FOREIGN PATENT DOCUMENTS

| | | |
|---|---|---|
| JP | 2015230629 A | 12/2015 |

OTHER PUBLICATIONS

International Preliminary Report on Patentability (Chapter II of the Patent Cooperation Treaty), PCT/IB2022/050741 mailed May 5, 2023 (27 pp. [includes 18 pp. Annex]).

(Continued)

*Primary Examiner* — Edward Martello
(74) *Attorney, Agent, or Firm* — NIXON PEABODY LLP

(57) ABSTRACT

A method includes receiving first image data associated with a first real-time video feed of an outer container having an outer label thereon. The method also includes identifying the outer label in the first real-time video feed by analyzing the received first image data. The method further includes determining first information associated with contents of the outer container by analyzing the identified outer label. The method then includes displaying, via a display device, at least a portion of the first real-time video feed of the outer container. Finally, the method includes augmenting the displayed first real-time video feed of the outer container based at least in part on the determined first information associated with the contents of the outer container.

20 Claims, 16 Drawing Sheets

(51) Int. Cl.
*G06V 20/40* (2022.01)
*G09B 5/06* (2006.01)
(52) U.S. Cl.
CPC ...... *G06T 2200/24* (2013.01); *G06T 2210/41*
(2013.01)

(56) References Cited

OTHER PUBLICATIONS

International Search Report in International Patent Application No. PCT/IB2022/050741 mailed Apr. 12, 2022 (3 pp.).
Written Opinion in International Patent Application No. PCT/IB2022/050741 mailed Apr. 12, 2022 (8 pp.).

* cited by examiner

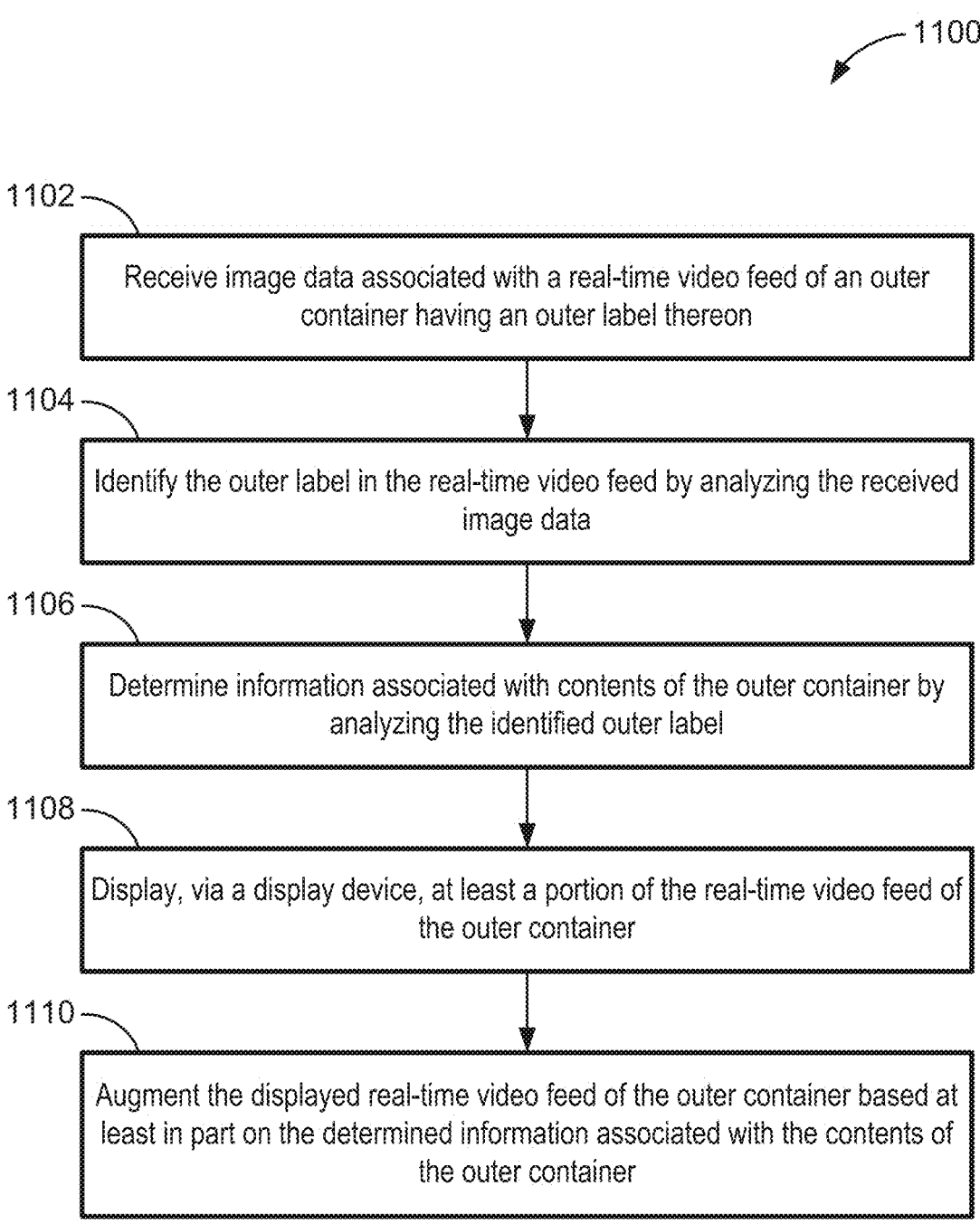

1100

1102 — Receive image data associated with a real-time video feed of an outer container having an outer label thereon 1104 — Identify the outer label in the real-time video feed by analyzing the received image data 1106 — Determine information associated with contents of the outer container by analyzing the identified outer label 1108 — Display, via a display device, at least a portion of the real-time video feed of the outer container 1110 — Augment the displayed real-time video feed of the outer container based at least in part on the determined information associated with the contents of the outer container

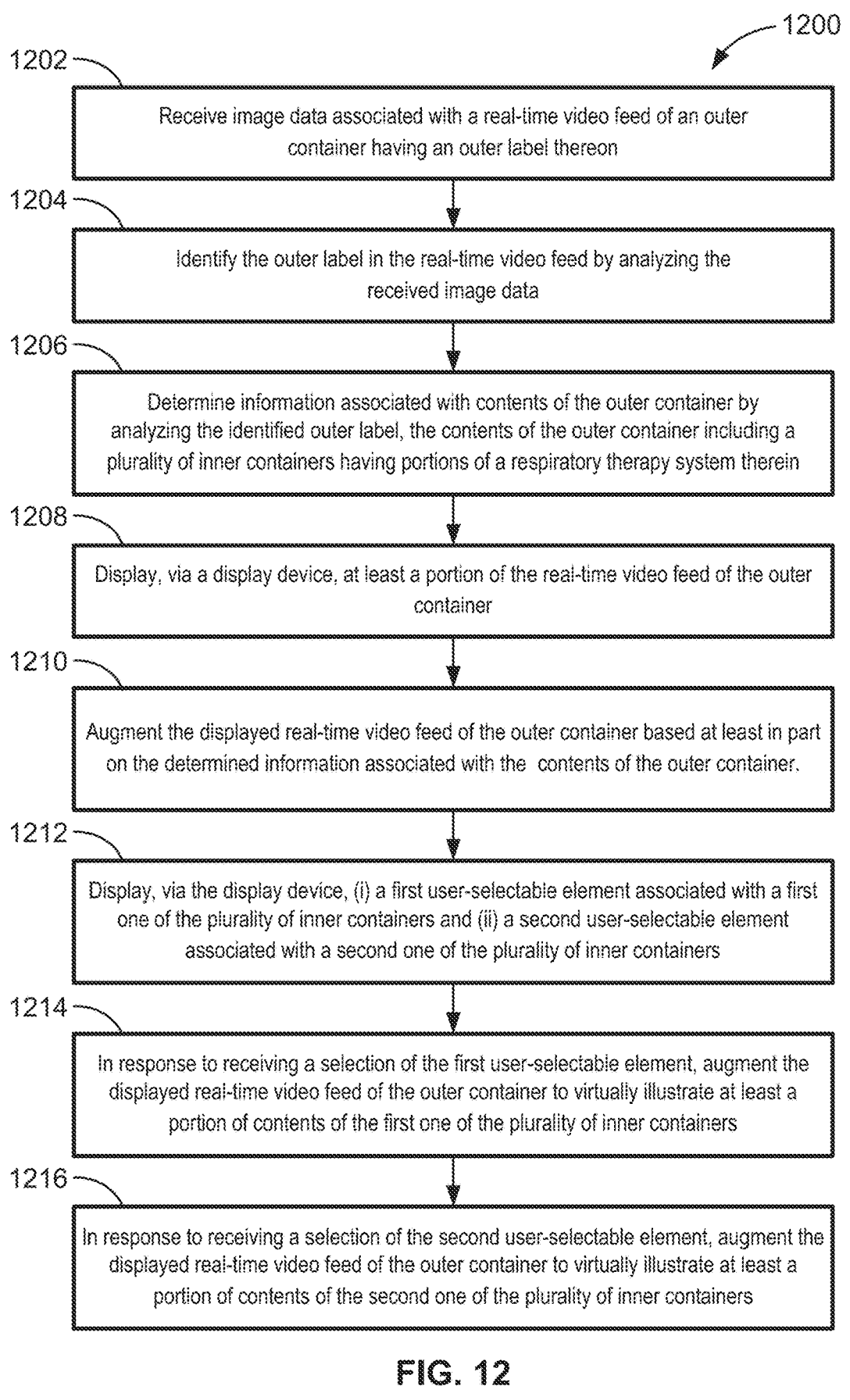

Receive image data associated with a real-time video feed of an outer container having an outer label thereon

1204

Identify the outer label in the real-time video feed by analyzing the received image data

1206

Determine information associated with contents of the outer container by analyzing the identified outer label, the contents of the outer container including a plurality of inner containers having portions of a respiratory therapy system therein

1208

Display, via a display device, at least a portion of the real-time video feed of the outer container

1210

Augment the displayed real-time video feed of the outer container based at least in part on the determined information associated with the contents of the outer container.

1212

Display, via the display device, (i) a first user-selectable element associated with a first one of the plurality of inner containers and (ii) a second user-selectable element associated with a second one of the plurality of inner containers

1214

In response to receiving a selection of the first user-selectable element, augment the displayed real-time video feed of the outer container to virtually illustrate at least a portion of contents of the first one of the plurality of inner containers

1216

In response to receiving a selection of the second user-selectable element, augment the displayed real-time video feed of the outer container to virtually illustrate at least a portion of contents of the second one of the plurality of inner containers

FIG. 12

SYSTEMS AND METHODS FOR RETRIEVING INFORMATION ASSOCIATED WITH CONTENTS OF A CONTAINER USING AUGMENTED REALITY

CROSS-REFERENCE TO RELATED APPLICATIONS

This application is a national stage of International Application No. PCT/IB2022/050741, filed Jan. 28, 2022, which claims priority to and the benefit of U.S. Provisional Patent Application No. 63/142,839, filed Jan. 28, 2021, each of which is hereby incorporated by reference herein in its entirety.

TECHNICAL FIELD

The present disclosure relates generally to systems and methods for retrieving information about contents of a container using augmented reality, and more particularly, to systems and methods for retrieving digital information about medical equipment packaged in a container, using augmented reality.

BACKGROUND

Many individuals suffer from sleep-related and/or respiratory disorders such as, for example, Periodic Limb Movement Disorder (PLMD), Restless Leg Syndrome (RLS), Sleep-Disordered Breathing (SDB), Obstructive Sleep Apnea (OSA), apneas, Cheyne-Stokes Respiration (CSR), respiratory insufficiency, Obesity Hyperventilation Syndrome (OHS), Chronic Obstructive Pulmonary Disease (COPD), Neuromuscular Disease (NMD), and chest wall disorders. These disorders are often treated using a respiratory therapy system. The respiratory therapy system is often delivered to patients packaged within different containers inside a large outer container. The patients sometimes need additional help understanding contents of the different containers, information associated with the contents and how to assemble the contents to form the respiratory therapy system that they can use to their benefit.

SUMMARY

According to some implementations of the present disclosure, a method includes receiving first image data associated with a first real-time video feed of an outer container having an outer label thereon. The method also includes identifying the outer label in the first real-time video feed by analyzing the received first image data. The method further includes determining first information associated with contents of the outer container by analyzing the identified outer label. The method then includes displaying, via a display device, at least a portion of the first real-time video feed of the outer container. Finally, the method includes augmenting the displayed first real-time video feed of the outer container based at least in part on the determined first information associated with the contents of the outer container.

According to some implementations of the present disclosure, a method includes receiving image data associated with a real-time video feed of an outer container having an outer label thereon. The method also includes identifying the outer label in the real-time video feed by analyzing the received image data. The method also includes determining information associated with contents of the outer container by analyzing the identified outer label, wherein the contents of the outer container includes a plurality of inner containers having portions of a respiratory therapy system therein. The method further includes displaying, via a display device, at least a portion of the real-time video feed of the outer container. The method then includes augmenting the displayed real-time video feed of the outer container based at least in part on the determined information associated with the contents of the outer container. The method also includes displaying, via the display device. (i) a first user-selectable element associated with a first one of the plurality of inner containers and (ii) a second user-selectable element associated with a second one of the plurality of inner containers. The method then includes augmenting the displayed real-time video feed of the outer container to virtually illustrate at least a portion of contents of the first one of the plurality of inner containers, in response to receiving a selection of the first user-selectable element. Finally, the method includes augmenting the displayed real-time video feed of the outer container to virtually illustrate at least a portion of contents of the second one of the plurality of inner containers, in response to receiving a selection of the second user-selectable element.

According to some implementations of the present disclosure, a system includes an outer container with an outer label thereon, a memory, and a control system. The outer container includes a first inner container with a first inner label and at least a second inner container with a second inner label. The memory stores machine-readable instructions. The control system includes one or more processors configured to execute the machine-readable instructions to receive first image data associated with a first real-time video feed of the outer and subsequently identify the outer label in the first real-time video feed by analyzing the received first image data. The control system is further configured to determine first information associated with contents of the outer container by analyzing the identified outer label. The control system is further configured to display, via a display device, at least a portion of the first real-time video feed of the outer container. The control system is further configured to augment the displayed first real-time video feed of the outer container based at least in part on the determined first information associated with the contents of the outer container. The control system is further configured to receive second image data associated with a second real-time video feed of the first inner container and third image data associated with a third real-time video feed of the second inner container subsequent to the first inner container and the second inner container being at least partially removed from the outer container. The control system is further configured to identify the first inner label in the second real-time video feed by analyzing the received second image data and the second inner label in the third real-time video feed by analyzing the received third image data. The control system is further configured to determine second information associated with contents of the first inner container by analyzing the identified first inner label, the contents of the first inner container including a first portion of a respiratory therapy system. The control system is further configured to determine third information associated with contents of the second inner container by analyzing the identified second inner label, the contents of the second inner container including a second portion of the respiratory therapy system. The control system is further configured to display, via the display device, at least a portion of the second real-time video feed of the first inner container. The control system is further configured to augment the displayed second real-time video feed of the first inner container based at least in part on the determined second information associated with the contents of the first inner container. The control system is further configured to display, via the display device, at least a portion of the third real-time video feed of the second inner container. The control system is further configured to augment the displayed third real-time video feed of the second inner container based at least in part on the determined third information associated with the contents of the second inner container. The control system is further configured to illustrate, via the display device, an assembly process for at least a portion of the respiratory therapy system.

The above summary is not intended to represent each implementation or every aspect of the present disclosure. Additional features and benefits of the present disclosure are apparent from the detailed description and figures set forth below.

BRIEF DESCRIPTION OF THE DRAWINGS

FIG. 11 illustrates a block diagram of a method of retrieving information about contents of a container using augmented reality, according to some implementations of the present disclosure; and FIG. 12 illustrates a block diagram of a method of retrieving information about contents of an outer container and a plurality of inner containers within the outer container, without opening the outer container, according to some implementations of the present disclosure.

Figure 1:
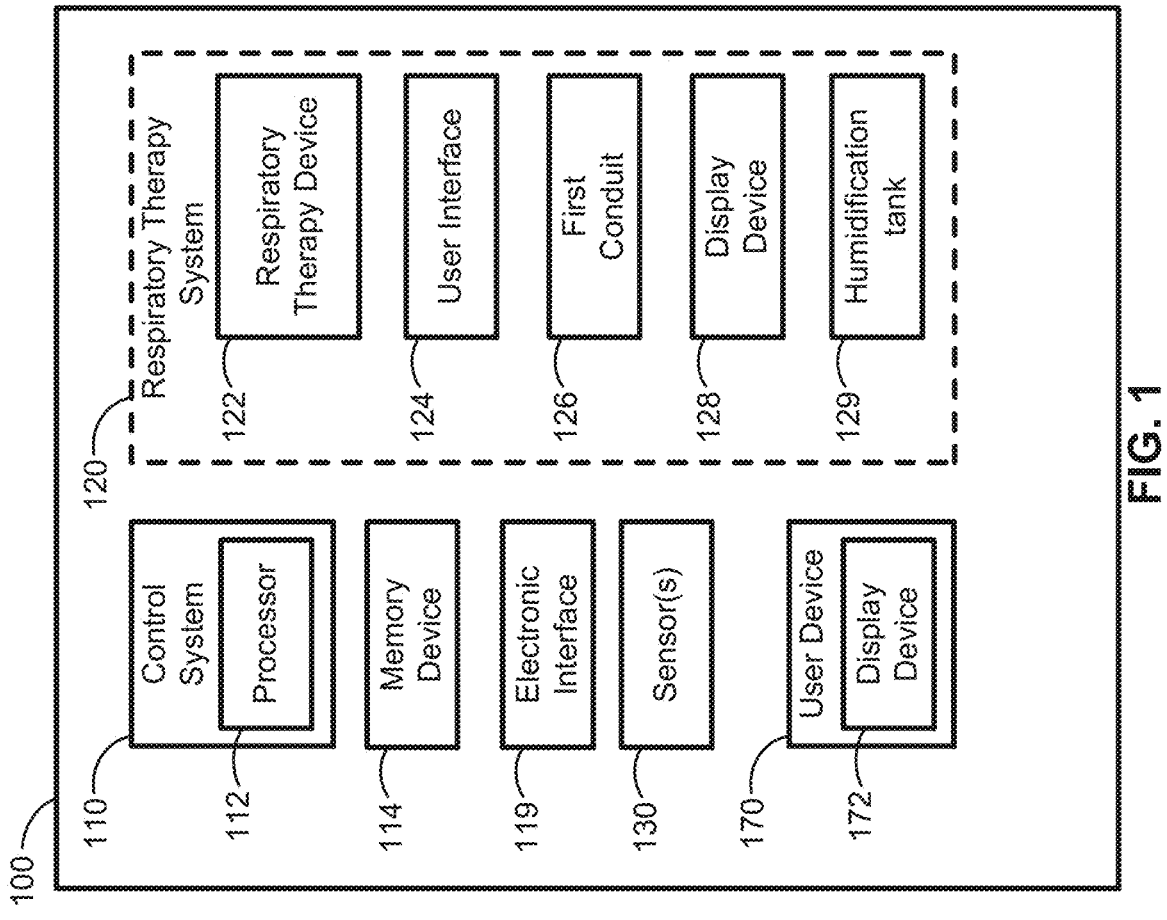
FIG. 1 is a functional block diagram of a respiratory therapy system, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

Many individuals suffer from sleep-related and/or respiratory disorders. Examples of sleep-related and/or respiratory disorders include Periodic Limb Movement Disorder (PLMD), Restless Leg Syndrome (RLS), Sleep-Disordered Breathing (SDB), Obstructive Sleep Apnea (OSA), apneas, Cheyne-Stokes Respiration (CSR), respiratory insufficiency, Obesity Hyperventilation Syndrome (OHS), Chronic Obstructive Pulmonary Disease (COPD), Neuromuscular Disease (NMD), and chest wall disorders.

Obstructive Sleep Apnea (OSA) is a form of Sleep Disordered Breathing (SDB), and is characterized by events including occlusion or obstruction of the upper air passage during sleep resulting from a combination of an abnormally small upper airway and the normal loss of muscle tone in the region of the tongue, soft palate and posterior oropharyngeal wall. More generally, an apnea generally refers to the cessation of breathing caused by blockage of the air (Obstructive Sleep Apnea) or the stopping of the breathing function (often referred to as central apnea). Typically, the individual will stop breathing for between about 15 seconds and about 30 seconds during an obstructive sleep apnea event.

Other types of apneas include hypopnea, hyperpnea, and hypercapnia. Hypopnea is generally characterized by slow or shallow breathing caused by a narrowed airway, as opposed to a blocked airway. Hyperpnea is generally characterized by an increase depth and/or rate of breathing. Hypercapnia is generally characterized by elevated or excessive carbon dioxide in the bloodstream, typically caused by inadequate respiration.

Cheyne-Stokes Respiration (CSR) is another form of sleep disordered breathing. CSR is a disorder of a patient's respiratory controller in which there are rhythmic alternating periods of waxing and waning ventilation known as CSR cycles. CSR is characterized by repetitive de-oxygenation and re-oxygenation of the arterial blood.

Obesity Hyperventilation Syndrome (OHS) is defined as the combination of severe obesity and awake chronic hypercapnia, in the absence of other known causes for hypoventilation. Symptoms include dyspnea, morning headache and excessive daytime sleepiness.

Chronic Obstructive Pulmonary Disease (COPD) encompasses any of a group of lower airway diseases that have certain characteristics in common, such as increased resistance to air movement, extended expiratory phase of respiration, and loss of the normal elasticity of the lung.

Neuromuscular Disease (NMD) encompasses many diseases and ailments that impair the functioning of the muscles either directly via intrinsic muscle pathology, or indirectly via nerve pathology. Chest wall disorders are a group of thoracic deformities that result in inefficient coupling between the respiratory muscles and the thoracic cage.

These and other disorders are characterized by particular events (e.g., snoring, an apnea, a hypopnea, a restless leg, a sleeping disorder, choking, an increased heart rate, labored breathing, an asthma attack, an epileptic episode, a seizure, or any combination thereof) that occur when the individual is sleeping.

The Apnea-Hypopnea Index (AHI) is an index used to indicate the severity of sleep apnea during a sleep session. The AHI is calculated by dividing the number of apnea and/or hypopnea events experienced by the user during the sleep session by the total number of hours of sleep in the sleep session. The event can be, for example, a pause in breathing that lasts for at least 10 seconds. An AHI that is less than 5 is considered normal. An AHI that is greater than or equal to 5, but less than 15 is considered indicative of mild sleep apnea. An AHI that is greater than or equal to 15, but less than 30 is considered indicative of moderate sleep apnea. An AHI that is greater than or equal to 30 is considered indicative of severe sleep apnea. In children, an AHI that is greater than 1 is considered abnormal. Sleep apnea can be considered "controlled" when the AHI is normal, or when the AHI is normal or mild. The AHI can also be used in combination with oxygen desaturation levels to indicate the severity of Obstructive Sleep Apnea.

Referring to FIG. 1, a system 100, according to some implementations of the present disclosure, is illustrated. The system 100 includes a control system 110, a memory device 114, an electronic interface 119, one or more sensors 130, and one or more user devices 170. In some implementations, the system 100 further optionally includes a respiratory therapy system 120, and an activity tracker 180. In the implementations described herein, the system 100 also includes an outer container 300, as described in further detail below.

The control system 110 includes one or more processors 112 (hereinafter, processor 112). The control system 110 is generally used to control (e.g., actuate) the various components of the system 100 and/or analyze data obtained and/or generated by the components of the system 100. The processor 112 can be a general or special purpose processor or microprocessor. While one processor 112 is shown in FIG. 1, the control system 110 can include any suitable number of processors (e.g., one processor, two processors, five processors, ten processors, etc.) that can be in a single housing, or located remotely from each other. The control system 110 can be coupled to and/or positioned within, for example, a housing of the user device 170, and/or within a housing of one or more of the sensors 130. The control system 110 can be centralized (within one such housing) or decentralized (within two or more of such housings, which are physically distinct). In such implementations including two or more housings containing the control system 110, such housings can be located proximately and/or remotely from each other.

The memory device 114 stores machine-readable instructions that are executable by the processor 112 of the control system 110. The memory device 114 can be any suitable computer readable storage device or media, such as, for example, a random or serial access memory device, a hard drive, a solid state drive, a flash memory device, etc. While one memory device 114 is shown in FIG. 1, the system 100 can include any suitable number of memory devices 114 (e.g., one memory device, two memory devices, five memory devices, ten memory devices, etc.). The memory device 114 can be coupled to and/or positioned within a housing of the respiratory therapy device 122, within a housing of the user device 170, within a housing of one or more of the sensors 130, or any combination thereof. Like the control system 110, the memory device 114 can be centralized (within one such housing) or decentralized (within two or more of such housings, which are physically distinct).

In some implementations, the memory device 114 (FIG. 1) stores a user profile associated with the user. The user profile can include, for example, demographic information associated with the user, biometric information associated with the user, medical information associated with the user, self-reported user feedback, sleep parameters associated with the user (e.g., sleep-related parameters recorded from one or more earlier sleep sessions), or any combination thereof. The demographic information can include, for example, information indicative of an age of the user, a gender of the user, a race of the user, a family history of insomnia or sleep apnea, an employment status of the user, an educational status of the user, a socioeconomic status of the user, or any combination thereof. The medical information can include, for example, information indicative of one or more medical conditions associated with the user, medication usage by the user, or both. The medical information data can further include a multiple sleep latency test (MSLT) result or score and/or a Pittsburgh Sleep Quality Index (PSQI) score or value. The self-reported user feedback can include information indicative of a self-reported subjective sleep score (e.g., poor, average, excellent), a self-reported subjective stress level of the user, a self-reported subjective fatigue level of the user, a self-reported subjective health status of the user, a recent life event experienced by the user, or any combination thereof.

The electronic interface 119 is configured to receive data (e.g., physiological data and/or audio data) from the one or more sensors 130 such that the data can be stored in the memory device 114 and/or analyzed by the processor 112 of the control system 110. The electronic interface 119 can communicate with the one or more sensors 130 using a wired connection or a wireless connection (e.g., using an RF communication protocol, a WiFi communication protocol, a Bluetooth communication protocol, over a cellular network, etc.). The electronic interface 119 can include an antenna, a receiver (e.g., an RF receiver), a transmitter (e.g., an RF transmitter), a transceiver, or any combination thereof. The electronic interface 119 can also include one more processors and/or one more memory devices that are the same as, or similar to, the processor 112 and the memory device 114 described herein. In some implementations, the electronic interface 119 is coupled to or integrated in the user device 170. In other implementations, the electronic interface 119 is coupled to or integrated (e.g., in a housing) with the control system 110 and/or the memory device 114.

As noted above, in some implementations, the system 100 optionally includes a respiratory therapy system 120 (also referred to as a respiratory therapy system). The respiratory therapy system 120 can include a respiratory therapy device 122 (referred to herein as respiratory therapy device 122), a user interface 124, a conduit 126 (also referred to as a tube or an air circuit), a display device 128, a humidification tank 129, or any combination thereof. In some implementations, the control system 110, the memory device 114, the display device 128, one or more of the sensors 130, and the humidification tank 129 are part of the respiratory therapy device 122. Respiratory pressure therapy refers to the application of a supply of air to an entrance to a user's airways at a controlled target pressure that is nominally positive with respect to atmosphere throughout the user's breathing cycle (e.g., in contrast to negative pressure therapies such as the tank ventilator or cuirass). The respiratory therapy system 120 is generally used to treat individuals suffering from one or more sleep-related respiratory disorders (e.g., obstructive sleep apnea, central sleep apnea, or mixed sleep apnea).

The respiratory therapy device 122 is generally used to generate pressurized air that is delivered to a user (e.g., using one or more motors that drive one or more compressors). In some implementations, the respiratory therapy device 122 generates continuous constant air pressure that is delivered to the user. In other implementations, the respiratory therapy device 122 generates two or more predetermined pressures (e.g., a first predetermined air pressure and a second predetermined air pressure). In still other implementations, the respiratory therapy device 122 is configured to generate a variety of different air pressures within a predetermined range. For example, the respiratory therapy device 122 can deliver at least about 6 cm $H_2O$, at least about 10 cm $H_2O$, at least about 20 cm $H_2O$, between about 6 cm $H_2O$ and about 10 cm $H_2O$, between about 7 cm $H_2O$ and about 12 cm $H_2O$, etc. The respiratory therapy device 122 can also deliver pressurized air at a predetermined flow rate between, for example, about-20 L/min and about 150 L/min, while maintaining a positive pressure (relative to the ambient pressure).

The user interface 124 engages a portion of the user's face and delivers pressurized air from the respiratory therapy device 122 to the user's airway to aid in preventing the airway from narrowing and/or collapsing during sleep. This may also increase the user's oxygen intake during sleep. Depending upon the therapy to be applied, the user interface 124 may form a seal, for example, with a region or portion of the user's face, to facilitate the delivery of gas at a pressure at sufficient variance with ambient pressure to effect therapy, for example, at a positive pressure of about 10 cm $H_2O$ relative to ambient pressure. For other forms of therapy, such as the delivery of oxygen, the user interface may not include a seal sufficient to facilitate delivery to the airways of a supply of gas at a positive pressure of about 10 cm $H_2O$.

Figure 2:
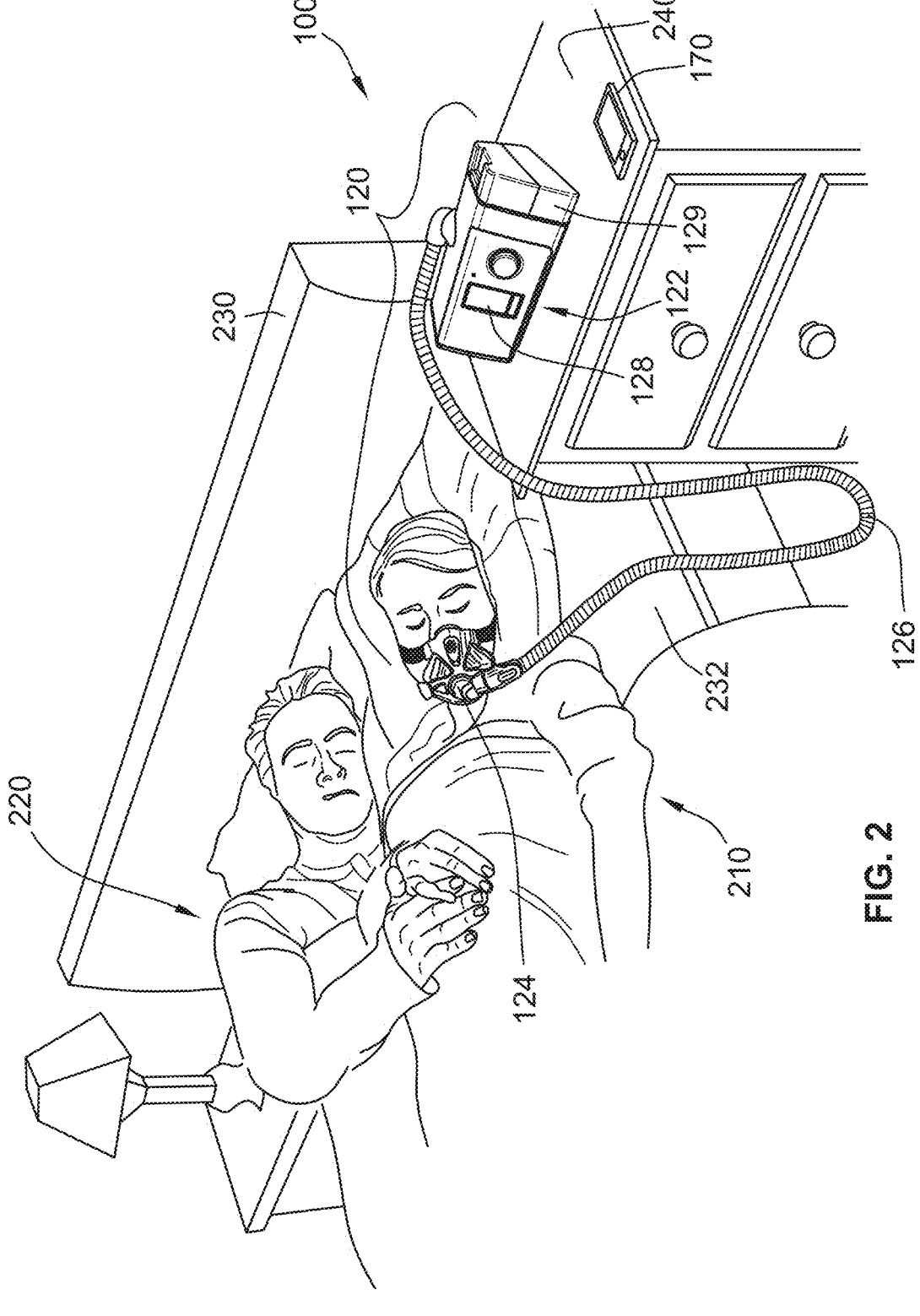
FIG. 2 is a perspective view of at least a portion of the respiratory therapy system of FIG. 1, a user, and a bed partner, according to some implementations of the present disclosure.

As shown in FIG. 2, in some implementations, the user interface 124 is a facial mask that covers the nose and mouth of the user. Alternatively, the user interface 124 can be a nasal mask that provides air to the nose of the user or a nasal pillow mask that delivers air directly to the nostrils of the user. The user interface 124 can include a plurality of straps (e.g., including hook and loop fasteners) for positioning and/or stabilizing the interface on a portion of the user (e.g., the face) and a conformal cushion (e.g., silicone, plastic, foam, etc.) that aids in providing an air-tight seal between the user interface 124 and the user. The user interface 124 can also include one or more vents for permitting the escape of carbon dioxide and other gases exhaled by the patient 210. In other implementations, the user interface 124 is a mouthpiece (e.g., a night guard mouthpiece molded to conform to the user's teeth, a mandibular repositioning device, etc.) for directing pressurized air into the mouth of the user.

The conduit 126 (also referred to as an air circuit or tube) allows the flow of air between two components of a respiratory therapy system 120, such as the respiratory therapy device 122 and the user interface 124. In some implementations, there can be separate limbs of the conduit 126 for inhalation and exhalation. In other implementations, a single limb conduit is used for both inhalation and exhalation.

One or more of the respiratory therapy device 122, the user interface 124, the conduit 126, the display device 128, and the humidification tank 129 can contain one or more sensors (e.g., a pressure sensor, a flow rate sensor, or more generally any of the other sensors 130) described herein). These one or more sensors 130 can be used, for example, to measure the air pressure and/or flow rate of pressurized air supplied by the respiratory therapy device 122.

The display device 128 is generally used to display image(s) including still images, video images, or both and/or information regarding the respiratory therapy device 122. For example, the display device 128 can provide information regarding the status of the respiratory therapy device 122 (e.g., whether the respiratory therapy device 122 is on/off, the pressure of the air being delivered by the respiratory therapy device 122, the temperature of the air being delivered by the respiratory therapy device 122, etc.) and/or other information (e.g., a sleep score, the current date/time, personal information for the patient 210, etc.). In some implementations, the display device 128 acts as a human-machine interface (HMI) that includes a graphic user interface (GUI) configured to display the image(s) as an input interface. The display device 128 can be an LED display, an OLED display, an LCD display, or the like. The input interface can be, for example, a touchscreen or touch-sensitive substrate, a mouse, a keyboard, or any sensor system configured to sense inputs made by a human user interacting with the respiratory therapy device 122.

The humidification tank 129 is coupled to or integrated in the respiratory therapy device 122 and includes a reservoir of water that can be used to humidify the pressurized air delivered from the respiratory therapy device 122. The respiratory therapy device 122 can include a heater to heat the water in the humidification tank 129 in order to humidify the pressurized air provided to the user. Additionally, in some implementations, the conduit 126 can also include a heating element (e.g., coupled to and/or imbedded in the conduit 126) that heats the pressurized air delivered to the user.

The respiratory therapy system 120 can be used, for example, as a ventilator or as a positive airway pressure (PAP) system, such as a continuous positive airway pressure (CPAP) system, an automatic positive airway pressure (APAP) system, a bi-level or variable positive airway pressure system (BPAP or VPAP), or any combination thereof. The CPAP system delivers a predetermined air pressure (e.g., determined by a sleep physician) to the user. The APAP system automatically varies the air pressure delivered to the user based on, for example, respiration data associated with the user. The BPAP or VPAP system is configured to deliver a first predetermined pressure (e.g., an inspiratory positive airway pressure or IPAP) and a second predetermined pressure (e.g., an expiratory positive airway pressure or EPAP) that is lower than the first predetermined pressure.

Referring to FIG. 2, a portion of the system 100 (FIG. 1), according to some implementations, is illustrated. A patient 210 of the respiratory therapy system 120 and a bed partner 220 are located in a bed 230 and are laying on a mattress 232. The user interface 124 (e.g., a full facial mask) can be worn by the patient 210 during a sleep session. The user interface 124 is fluidly coupled and/or connected to the respiratory therapy device 122 via the conduit 126. In turn, the respiratory therapy device 122 delivers pressurized air to the patient 210 via the conduit 126 and the user interface 124 to increase the air pressure in the throat of the patient 210 to aid in preventing the airway from closing and/or narrowing during sleep. The respiratory therapy device 122 can be positioned on a nightstand 240 that is directly adjacent to the bed 230 as shown in FIG. 2, or more generally, on any surface or structure that is generally adjacent to the bed 230 and/or the patient 210.

Referring to back to FIG. 1, the one or more sensors 130 of the system 100 may include a pressure sensor, a flow rate sensor, temperature sensor, a motion sensor, a microphone, a speaker, a radio-frequency (RF) receiver, a RF transmitter, a camera, an infrared sensor, a photoplethysmogram (PPG) sensor, an electrocardiogram (ECG) sensor, an electroencephalography (EEG) sensor, a capacitive sensor, a force sensor, a strain gauge sensor, an electromyography (EMG) sensor, an oxygen sensor, an analyte sensor, a moisture sensor, a LiDAR sensor, or any combination thereof. Generally, each of the one or sensors 130) are configured to output sensor data that is received and stored in the memory device 114 or one or more other memory devices.

The one or more sensors 130 can be used to generate, for example, physiological data, audio data, or both. Physiological data generated by one or more of the sensors 130 can be used by the control system 110 to determine a sleep-wake signal associated with a user during a sleep session and one or more sleep-related parameters. The sleep-wake signal can be indicative of one or more sleep states, including wakefulness, relaxed wakefulness, micro-awakenings, a rapid eye movement (REM) stage, a first non-REM stage (often referred to as "N1"), a second non-REM stage (often referred to as "N2"), a third non-REM stage (often referred to as "N3"), or any combination thereof. The sleep-wake signal can also be timestamped to indicate a time that the user enters the bed, a time that the user exits the bed, a time that the user attempts to fall asleep, etc. The sleep-wake signal can be measured by the sensor(s) 130 during the sleep session at a predetermined sampling rate, such as, for example, one sample per second, one sample per 30 seconds, one sample per minute, etc. Examples of the one or more sleep-related parameters that can be determined for the user during the sleep session based on the sleep-wake signal include a total time in bed, a total sleep time, a sleep onset latency, a wake-after-sleep-onset parameter, a sleep efficiency, a fragmentation index, or any combination thereof.

Physiological data and/or audio data generated by the one or more sensors 130 can also be used to determine a respiration signal associated with a user during a sleep session. The respiration signal is generally indicative of respiration or breathing of the user during the sleep session. The respiration signal can be indicative of, for example, a respiration rate, a respiration rate variability, an inspiration amplitude, an expiration amplitude, an inspiration-expiration ratio, a number of events per hour, a pattern of events, pressure settings of the respiratory therapy device 122, or any combination thereof. The event(s) can include snoring, apneas, central apneas, obstructive apneas, mixed apneas, hypopneas, a mask leak (e.g., from the user interface 124), a restless leg, a sleeping disorder, choking, an increased heart rate, labored breathing, an asthma attack, an epileptic episode, a seizure, or any combination thereof.

The user device 170 (FIG. 1) includes a display device 172. The user device 170 can be, for example, a mobile device such as a smart phone, a tablet, a laptop, or the like. Alternatively, the user device 170 can be an external sensing system, a television (e.g., a smart television) or another smart home device (e.g., a smart speaker(s) such as Google Home, Amazon Echo, Alexa etc.). In some implementations, the user device 170 is a wearable device (e.g., a smart watch). The display device 172 is generally used to display image(s) including still images, video images, or both. In some implementations, the display device 172 acts as a human-machine interface (HMI) that includes a graphic user interface (GUI) configured to display the image(s) and an input interface. The display device 172 can be an LED display, an OLED display, an LCD display, or the like. The input interface can be, for example, a touchscreen or touch-sensitive substrate, a mouse, a keyboard, or any sensor system configured to sense inputs made by a human user interacting with the user device 170. In some implementations, one or more user devices 170 can be used by and/or included in the system 100.

Referring back to FIG. 1, while the control system 110 and the memory device 114 are described and shown in FIG. 1 as being a separate and distinct component of the system 100, in some implementations, the control system 110 and/or the memory device 114 are integrated in the user device 170 and/or the respiratory therapy device 122. Alternatively, in some implementations, the control system 110 or a portion thereof (e.g., the processor 112) can be located in a cloud (e.g., integrated in a server, integrated in an Internet of Things (IoT) device, connected to the cloud, be subject to edge cloud processing, etc.), located in one or more servers (e.g., remote servers, local servers, etc., or any combination thereof.

While system 100 is shown as including all of the components described above, more or fewer components can be included in a system according to implementations of the present disclosure. For example, a first alternative system includes the control system 110, the memory device 114, and at least one of the one or more sensors 130) and does not include the respiratory therapy system 120. As another example, a second alternative system includes the control system 110, the memory device 114, at least one of the one or more sensors 130, and the user device 170. As yet another example, a third alternative system includes the control system 110, the memory device 114, the respiratory therapy system 120, at least one of the one or more sensors 130, and the user device 170. Thus, various systems can be formed using any portion or portions of the components shown and described herein and/or in combination with one or more other components.

Figures 3A, 3B:
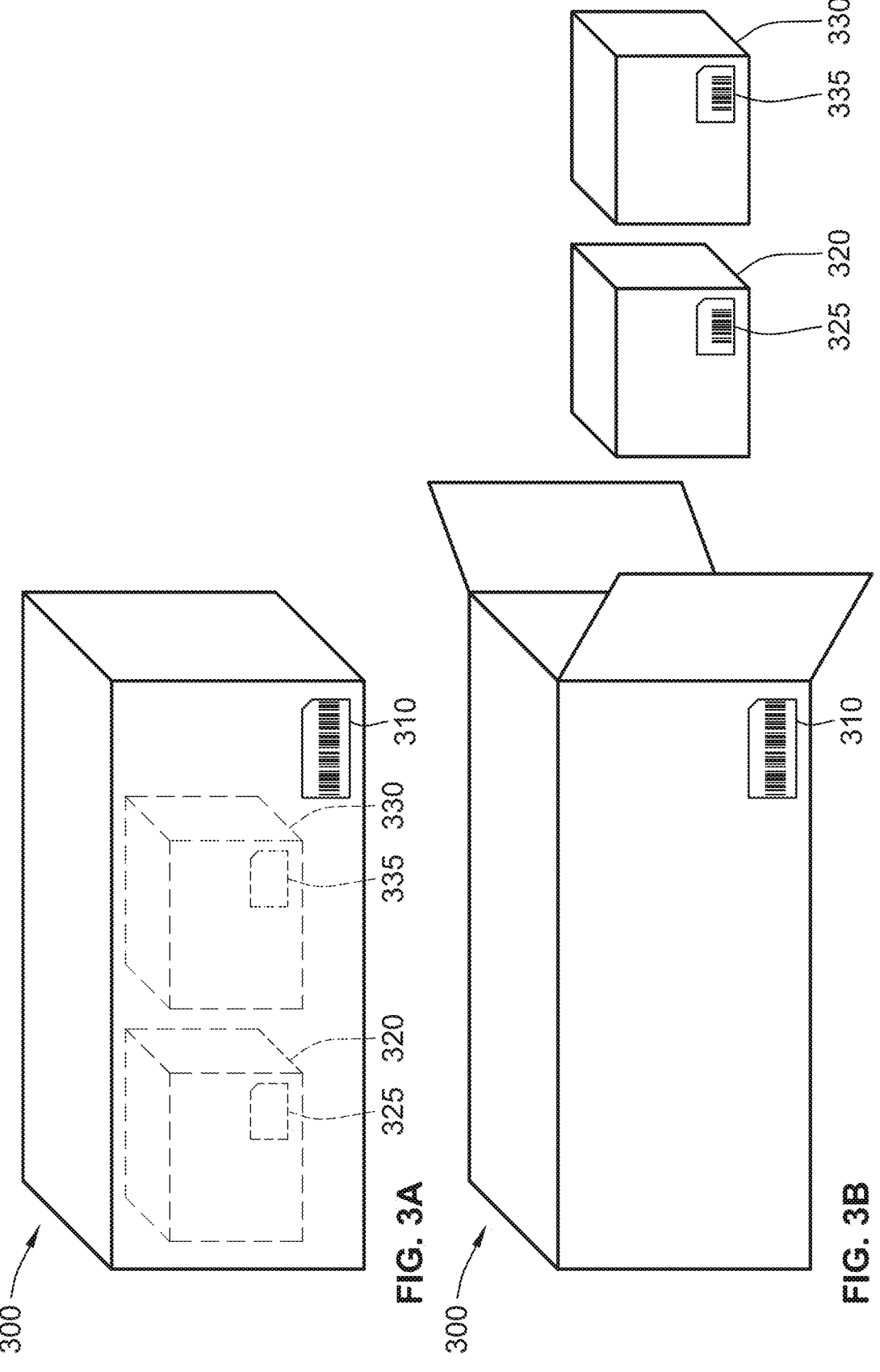
FIG. 3A illustrates an outer container, in a closed configuration, having inner containers with portions of the respiratory therapy system, according to some implementations of the present disclosure.
FIG. 3B illustrates the outer container of FIG. 3A in an open configuration and the inner containers removed from the outer container, according to some implementations of the present disclosure.

FIG. 3A illustrates an outer container 300, in a closed configuration, having some or all portions of the respiratory therapy system 120, as delivered to the patient 210, according to some implementations of the present disclosure. The outer container 300 has an outer label 310, which may be a QR-code, an infrared image, a bar code, text, or any combination thereof. The outer label 310 is configured to be deliver digital information about contents of the outer container 300 to the patient 210, when the outer label 310 is scanned. The outer container 300) includes a first inner container 320 having a first inner label 325 attached thereon and at least a second inner container 330 having a second inner label 335 attached thereon. In some implementations (not shown), the outer container 300 may include a third inner container and even a fourth inner container. Each of the first inner container 320 and the second inner container 330) (as well as the third inner container and the fourth inner container which are not shown) include some portions of the respiratory therapy system 120. Each of the outer container 300, the first inner container 320 and the at least second inner container 330 may be made of a rigid or a flexible material such as, but not limited to, cardboard, paper, plastic, nylon, leather, jute, and the like.

The first inner label 325 and the second inner label 335 are configured to deliver digital information about contents of the first inner container 320 and the second inner container 330) respectively. Each of the first inner label 325 and the second inner label 335 may be a QR-code, an infrared image, a bar code, text, or any combination thereof. FIG. 3B illustrates the outer container 300, in an open configuration, after the first inner container 320 and the second inner container 330 are removed at least partially from the outer container 300 such that the first inner label 325 and the second inner label 335 can be scanned.

The process of delivering the digital information about the contents of the outer container 300, according to some implementations of the disclosure are illustrated with respect to FIG. 4A-12. In some implementations, the patient 210 receives digital information about only the contents of the outer container 300 upon scanning the outer label 310. The patient 210 is then prompted to open the outer container 300 and at least partially remove the first inner container 320) and the second inner container 330 to scan the first inner label 325 and the second inner label 335 respectively. Such implementations are exemplified with respect to FIG. 11, which illustrates a block diagram of a corresponding method 1100 of retrieving information about contents of the outer container 300 using augmented reality.

In other implementations, the patient 210 receives digital information about the contents of the outer container 300, first inner container 320, and the second inner container 330 without opening the outer container 300. In such implementations, the digital information is delivered by scanning the outer label 310 only, as further described with respect to FIG. 12, which illustrates a block diagram of a corresponding method 1200 of retrieving information about contents of the outer container 300, the first inner container 320, and the second inner container 330 using augmented reality. A description of the method 1200 follows a description of the method 1100 and associated illustrations and demonstrations.

Figure 4A:
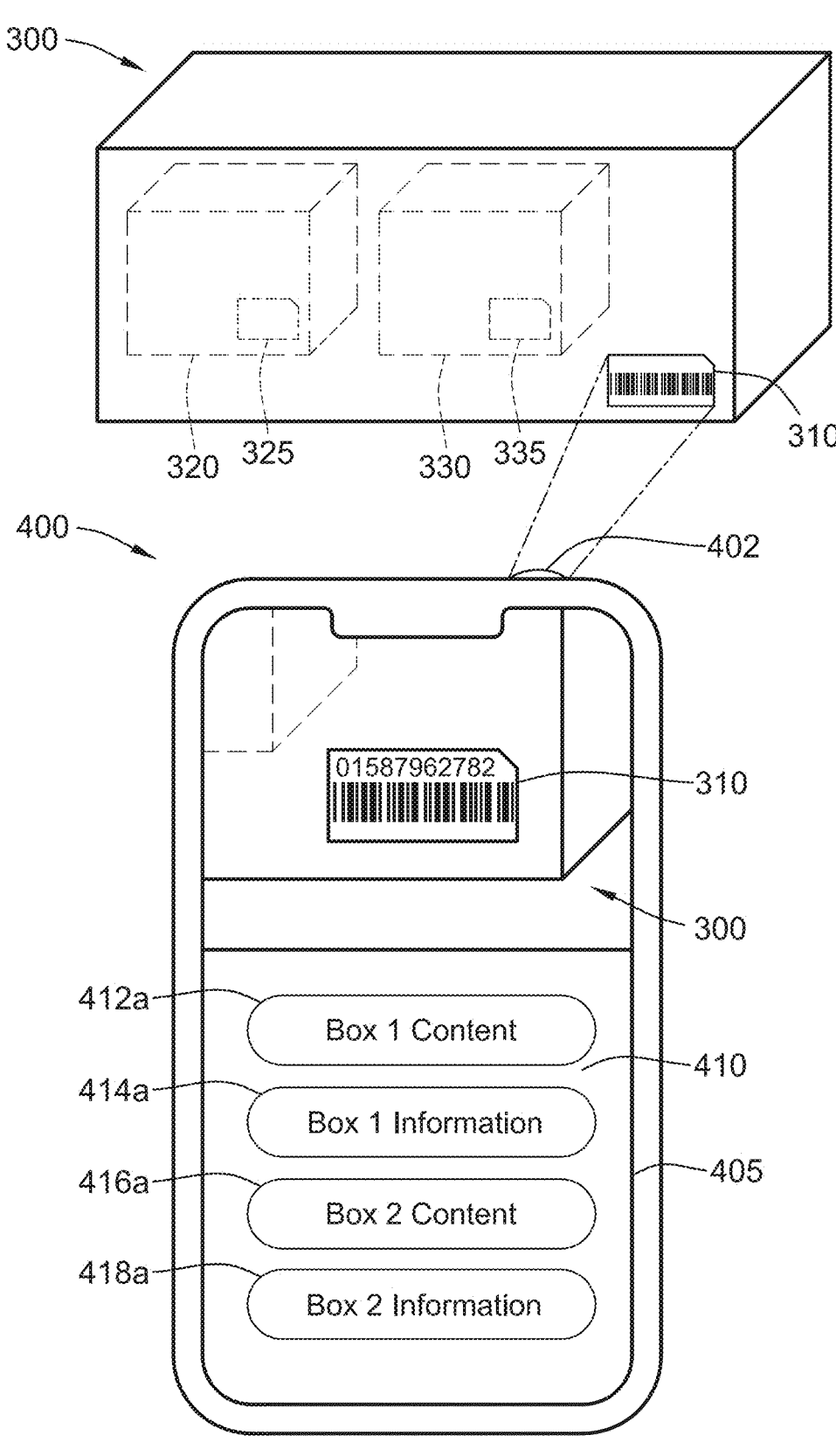
FIG. 4A illustrates a real-time video feed on a display device when an outer label of the outer container of FIG. 3A is scanned, according to some implementations of the present disclosure.
Figure 4B:
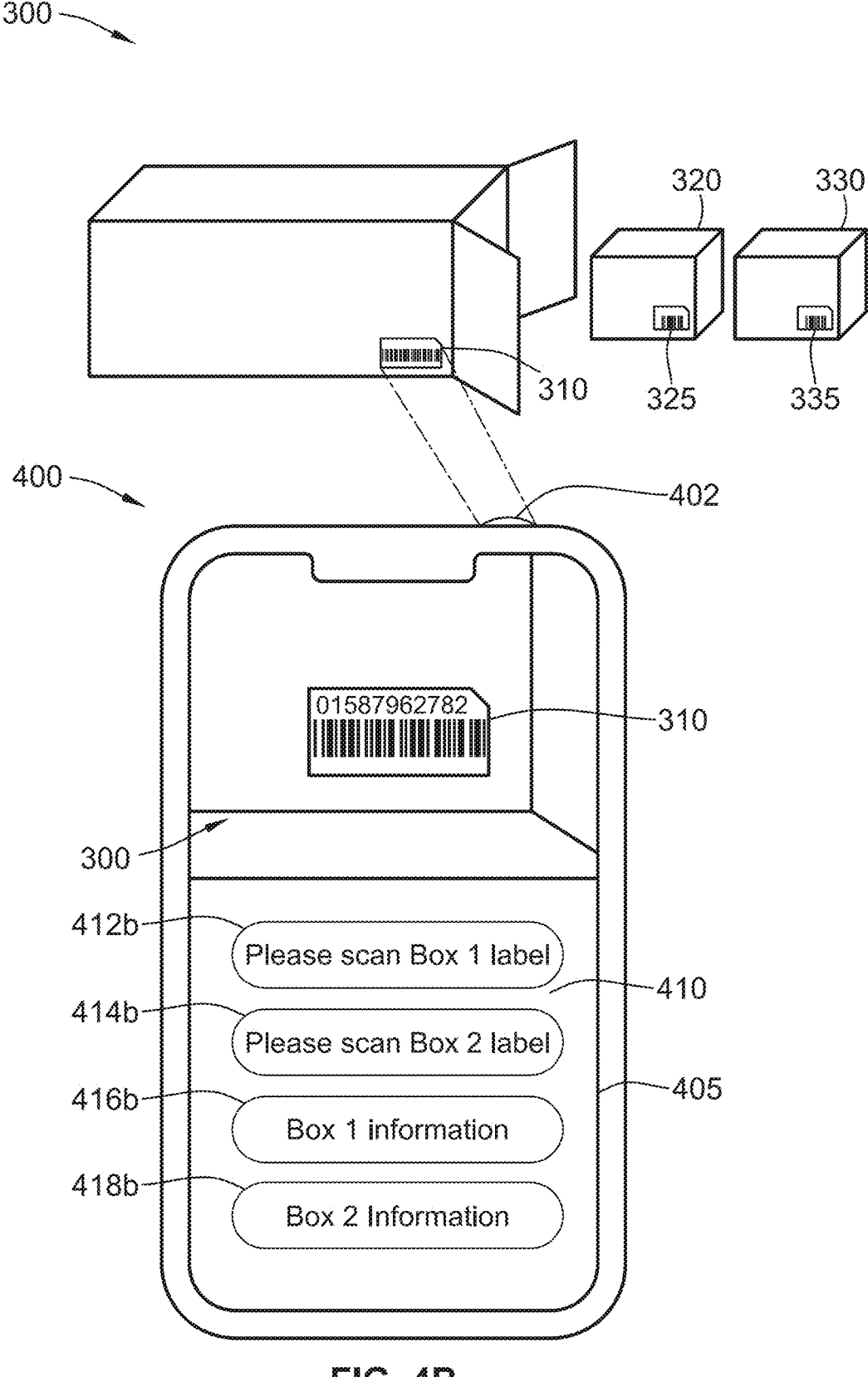
FIG. 4B illustrates a real-time video feed on the display device when the outer label of the outer container of FIG. 3B is scanned, according to some implementations of the present disclosure.

When the patient 210) receives the outer container 300, he utilizes a mobile device 400 to scan the outer label 310, as shown in FIGS. 4A-4B. The mobile device 400 is substantially similar to the user device 170 described above and includes a camera 402 to scan a label such as, but not limited to, a QR-code, an infrared image, a bar code, text, or any combination thereof. The mobile device 400 has a display device 405, substantially similar to the display device 172 described above. The display device 405 is a display screen that may or may not directly coupled to the mobile device 400. The digital information about the contents of the outer container 300, the first inner container 320, and the second inner container 330) are delivered to the patient 210 through a graphical interface 410 of a software application (not shown) installed in the mobile device 400. The digital information may be stored in the software application or in a remote server such as, but not limited to, a cloud server (not shown) connected to the software application.

In some implementations, when the patient 210 is ready to scan the outer label 310, the patient 210 turns on the camera 402 in the mobile device 400 as well as positions and/or orients the camera 402 such that the outer label 310 is within the field of view of the camera 402. In other implementations, the mobile device 400 may prompt the patient 210 to turn on the camera 402 as well as to position and/or orient the camera 402 to scan the outer label 310. The camera 402 then begins transmitting a real-time video feed of at least a portion of the outer label 310 on the outer container 300 to a processor (not shown, but substantially similar to the processor 112 described above) within the mobile device 400. The processor then executes the steps of the method 1100 and subsequent steps, as described below. The real-time video feed is shown on the display device 405 to the patient 210 and may also be stored on the memory device 114. Once the processor has determined that the outer label 310 has been scanned, it may cease producing the real-time video of the outer container 300 and transition to showing the outer container 300 in augmented reality on the display device 405, as described below.

As described herein. "augmented reality" of a real-time video feed or an image of a real-time video feed includes providing an interactive virtual representation overlaid on contents depicted in the real-time video feed. The interactive virtual representation may include indicators, virtual images, audio, video, text, or any combination thereof.

Step 1102 of the method 1100 starts with the processor in the mobile device 400 receiving image data associated with a real-time video feed of the outer container 300. In step 1104, the processor in the mobile device 400 identifies the outer label 310 in the real-time video feed by analyzing the received image data. In step 1106, then the processor in the mobile device 400 determines information associated with contents of the outer container 300 by analyzing the outer label 310. In the implementation shown in FIG. 4B, the outer container 300 includes the first inner container 320 and the second inner container 330. The information associated with the contents of the outer container 300 may be customized for the patient 210 based on either an expected use location or the current location of the respiratory therapy system 120 packaged within the outer container 300).

In step 1108, at least a portion of the real-time video feed of the outer container 300 is displayed on the display device 405, as shown in FIG. 4B. Subsequently, in step 1110, the real-time video feed of the outer container 300 is augmented based at least in part on the information associated with the contents of the outer container 300. In the implementation shown in FIG. 4B, when the outer label 310 is scanned, the graphical interface 410 appears on the display device 405. The graphical interface 410 highlights the outer label 310 in the outer container 300 and shows the following user-selectable elements to the patient 210: "Please scan Box 1 label" element 412*b*. "Please scan Box 2 label" element 414*b*. "Box 1 Information" element 416*b*, and "Box 2 Information" element 418*b*. In different implementations, the graphical interface 410 may use an audio alert, a video alert, a text alert, or any combination thereof to prompt the patient 210 to receive more information on the contents of the outer container 300.

If the patient 210 clicks on element 412*b*, the patient 210 proceeds to at least partially remove the first inner container 320 from the outer container 300. Subsequently, the patient 210 positions and/or orients the camera 402 such that the first inner label 325 is within the field of view of the camera 402. In some implementations, the mobile device 400 may prompt the patient 210 to position and/or orient the camera 402 to scan the first inner label 325. The camera 402 then begins transmitting a real-time video feed of the first inner container 320 and at least a portion of the first inner label 325 to the processor of the mobile device 400. The real-time video feed is shown on the display device 405 to the patient 210 and may also be stored on the memory device 114. The processor receives image data associated with the real-time video feed of the first inner label 325. Once the processor has determined that the first inner label 325 has been scanned and identified the first inner label 325 by analyzing the image data, it determines information associated with contents of the first inner container 320. At that time, the processor may cease producing the real-time video of the first inner container 320) and transition to showing the first inner container 320 in augmented reality on the display device 405, as described below.

Figure 5B:
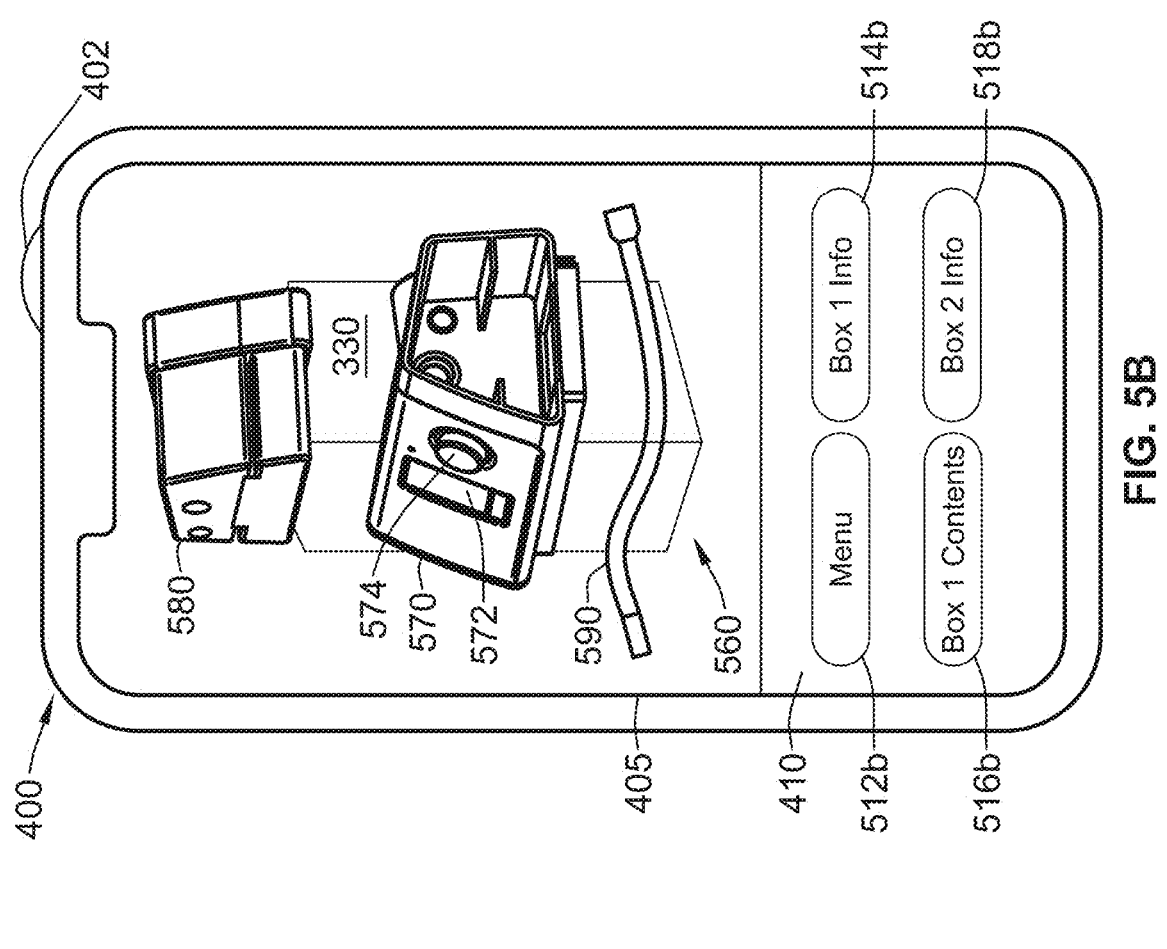
FIG. 5B illustrates a real-time video feed on the display device when a second inner label on a second inner container of the outer container is scanned, according to some implementations of the present disclosure.
Figure 5A:
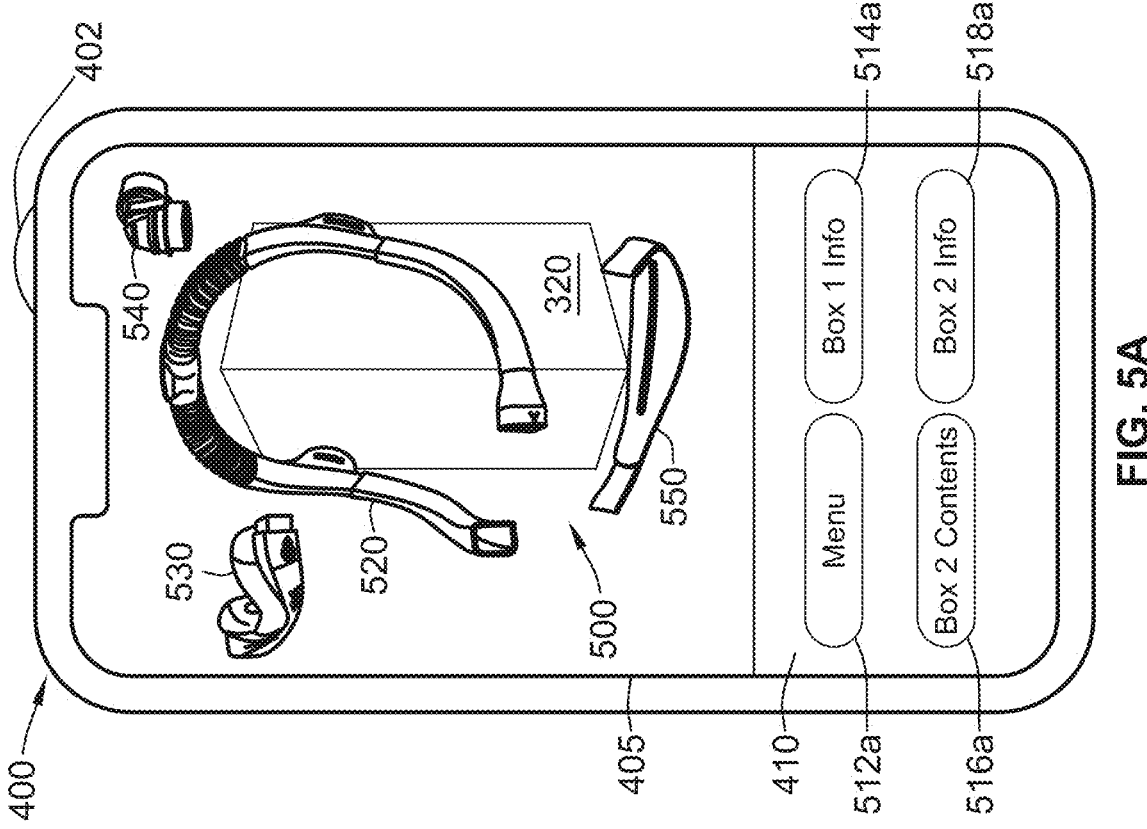
FIG. 5A illustrates a real-time video feed on the display device when a first inner label on a first inner container of the outer container is scanned, according to some implementations of the present disclosure.

FIG. 5A illustrates a real-time video feed on the display device 405 when the first inner label 325 is scanned. The real-time video feed in FIG. 5A shows contents of the first inner container 320, even though the first inner container 320 has not been opened yet. The contents of the first inner container 320 include portions of a user interface 500 of the respiratory therapy system 120. The user interface 500 is substantially similar to the user interface 124 as described above. The user interface 500) includes a headgear conduit 520, a cushion 530, a connector 540), and a headgear strap 550. The real-time video feed in FIG. 5C highlights a three-dimensional representation of the headgear conduit 520, the cushion 530, the connector 540), and the headgear strap 550 in the foreground with an image of the first inner container 320 in the background. The graphical interface 410 shows the following user-selectable elements to the patient 210: "Menu" element 512*a*, "Box 1 Information" element 514*a*, "Box 2 Contents" element 516*a*, and "Box 2 Information" element 518*a*.

If the patient 210 clicks element 512*a*, the graphical interface 410) returns to the previous screen shown in FIG. 4B such that the patient 210 can select a different user-selectable element. If the patient 210 clicks element 514*a*, the graphical interface 410) proceeds to a screen as described below and shown with respect to FIG. 5C. If the patient 210 clicks element 516*a*, the graphical interface 410 proceeds to a screen as described below and shown with respect to FIG. 5B. If the patient 210 clicks element 518*a*, the graphical interface 410 proceeds to a screen as described below and shown with respect to FIG. 5D.

Referring back to FIG. 4B, if the patient 210 clicks on element 414*b*, the patient 210 proceeds to at least partially remove the second inner container 330 from the outer container 300. Subsequently, the patient 210 positions and/or orients the camera 402 such that the second inner label 335 is within the field of view of the camera 402. In some implementations, the mobile device 400 may prompt the patient 210 to position and/or orient the camera 402 to scan the second inner label 335. The camera 402 then begins transmitting a real-time video feed of the second inner container 330) and at least a portion of the second inner label 335 to the processor of the mobile device 400. The real-time video feed is shown on the display device 405 to the patient 210 and may also be stored on the memory device 114. The processor receives image data associated with the real-time video feed of the second inner label 335. Once the processor has determined that the second inner label 335 has been scanned and identified the second inner label 335 by analyzing the image data, it determines information associated with contents of the second inner container 330. At that time, the processor may cease producing the real-time video of the second inner container 330 and transition to showing the second inner container 330 in augmented reality on the display device 405, as described below:

FIG. 5B illustrates a real-time video feed on the display device 405 when the second inner label 335 is scanned. The real-time video feed in FIG. 5B shows contents of the second inner container 330, even though the second inner container 330 has not been opened yet. The contents of the second inner container 330 include portions of a respiratory therapy assembly 560 of the respiratory therapy system 120. The respiratory therapy assembly 560 includes a respiratory therapy device 570) (substantially similar to the respiratory therapy device 122), a humidification tank 580 (substantially similar to the humidification tank 129), and a conduit 590 (substantially similar to the first conduit 126). The respiratory therapy device 570 includes a display screen 572 (substantially similar to the display device 128) and a control interface 574. In some implementations, the humidification tank 580 may be packaged within a third container (not shown) or a fourth container (not shown) within the outer container 300. In some implementations, the conduit 590 may be disposed loosely within the outer container 300, packaged within the first inner container 320, or a third inner container (not shown) within the outer container 300. The real-time video feed in FIG. 5B highlights a three-dimensional representation of the respiratory therapy device 570, the humidification tank 580, and the conduit 590 in the foreground with an image of the second inner container 330 in the background. The graphical interface 410 shows the following user-selectable elements to the patient 210): "Menu" element 512b. "Box 1 Information" element 514b. "Box 1 Contents" element 516b, and "Box 2 Information" element 518b.

If the patient 210 clicks element 512b, the graphical interface 410) returns to the previous screen shown in FIG. 4B such that the patient 210 can select a different user-selectable element. If the patient 210 clicks element 514b, the graphical interface 410 proceeds to a screen as described and shown with respect to FIG. 5C. If the patient 210 clicks element 516b, the graphical interface 410 proceeds to a screen as described and shown with respect to FIG. 5A. If the patient 210 clicks element 518c, the graphical interface 410 proceeds to a screen as described below and shown with respect to FIG. 5D.

Figures 5C, 5D:
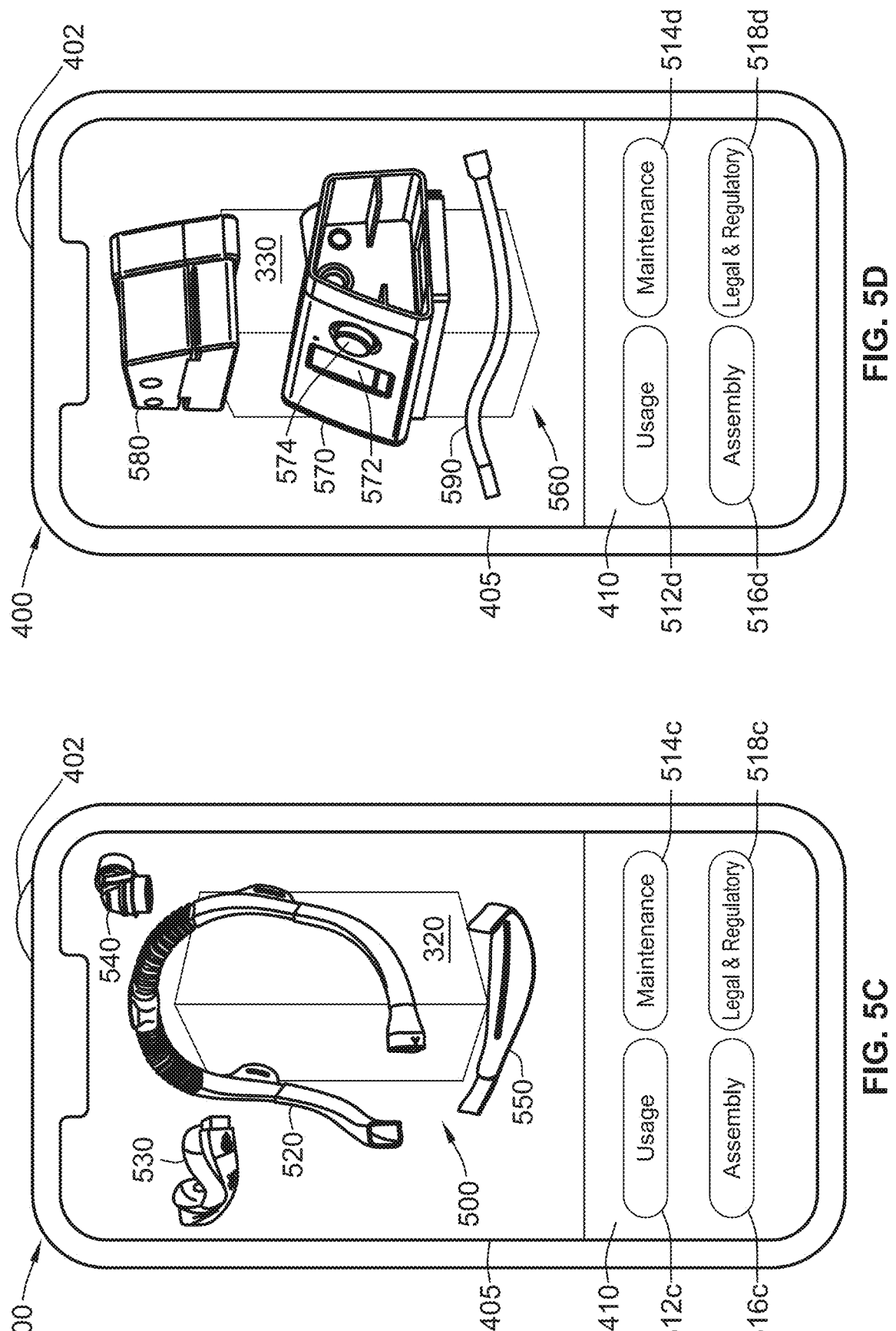
FIG. 5C illustrates a real-time video feed on the display device prompting a user to access detailed information about contents of the first inner container of FIG. 5A, according to some implementations of the present disclosure.
FIG. 5D illustrates a real-time video feed on the display device prompting a user to access detailed information about contents of the second inner container of FIG. 5B, according to some implementations of the present disclosure.

Referring back to FIG. 4B, if the patient 210 clicks on element 416b, the patient 210 receives more information associated with the contents of the first inner container 320. Such information can be accessed through a number of user-selectable elements on the graphical interface 410. Such information may include component information on the user interface 500, assembly instructions for the user interface 500 as well as usage information, maintenance information, health benefit information, legal and regulatory information, or any combination thereof pertaining to the user interface 500. FIG. 5C illustrates a real-time video feed on the display device 405 prompting the patient 210 to access detailed information about the user interface 500. The real-time video feed in FIG. 5C highlights the three-dimensional representation of the headgear conduit 520, the cushion 530, the connector 540), and the headgear strap 550) in the foreground with an image of the first inner container 320 in the background. The graphical interface 410 shows the following user-selectable elements to the patient 210: "Usage" element 512c. "Maintenance" element 514c. "Assembly" element 516c, and "Legal & Regulatory" element 518c.

If the patient 210 clicks element 512c, the graphical interface 410 displays information related to usage and health benefit of the user interface 500. If the patient 210 clicks element 514c, the graphical interface 410 displays information on how to maintain the user interface 500. If the patient 210 clicks element 516c, the graphical interface 410 displays information on assembling the headgear conduit 520, the cushion 530, the connector 540), and the headgear strap 550) to form the user interface 500, as described below and shown with respect to FIG. 9A-9B. If the patient 210 clicks element 518c, the graphical interface 410 displays legal and regulatory information related to the user interface 500.

Referring back to FIG. 4B, if the patient 210 clicks on element 418b, the patient 210 receives more information associated with the contents of the second inner container 330. Such information can be accessed through a number of user-selectable elements on the graphical interface 410. Such information may include component information on the respiratory therapy assembly 560, assembly instructions for the respiratory therapy assembly 560 as well as usage information, maintenance information, health benefit information, legal and regulatory information, or any combination thereof pertaining to the respiratory therapy assembly 560. FIG. 5D illustrates a real-time video feed on the display device 405 prompting the patient 210 to access detailed information about the respiratory therapy assembly 560. The real-time video feed in FIG. 5D highlights the three-dimensional representation of the respiratory therapy device 570, the humidification tank 580), and the conduit 590 in the foreground with the image of the second inner container 330 in the background. The graphical interface 410 shows the following user-selectable elements to the patient 210: "Usage" element 512d. "Maintenance" element 514d. "Assembly" element 516d, and "Legal & Regulatory" element 518d.

If the patient 210 clicks element 512d, the graphical interface 410 displays information related to usage and health benefit of the respiratory therapy assembly 560. If the patient 210 clicks element 514d, the graphical interface 410 displays information on how to maintain the respiratory therapy assembly 560. If the patient 210 clicks element 516d, the graphical interface 410 displays information on assembling the respiratory therapy device 570, the humidification tank 580, and the conduit 590 to form the respiratory therapy assembly 560, as described below and shown with respect to FIG. 9C-9D. If the patient 210 clicks element 518d, the graphical interface 410 displays legal and regulatory information related to the respiratory therapy assembly 560.

Figure 6A:
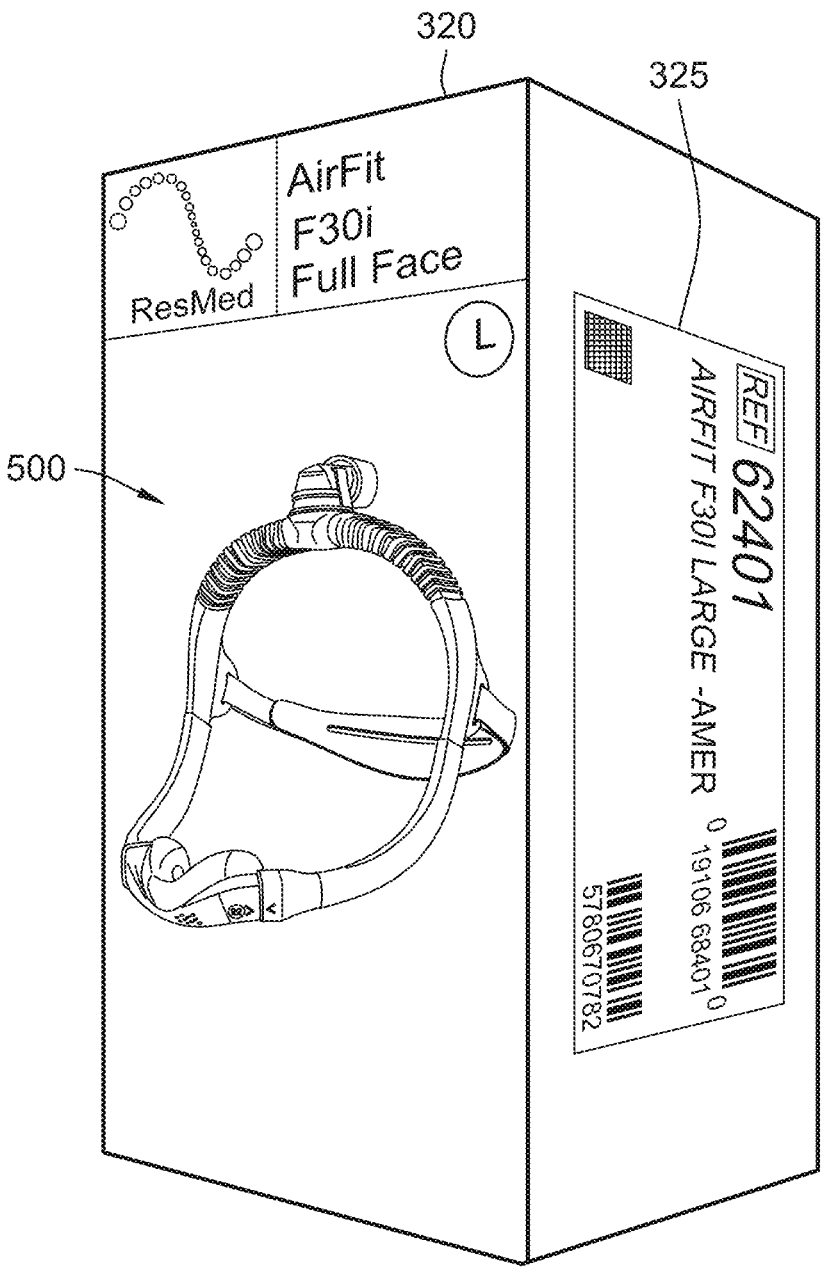
FIG. 6A illustrates the first inner container including a first portion of the respiratory therapy system, according to some implementations of the present disclosure.
Figure 6B:
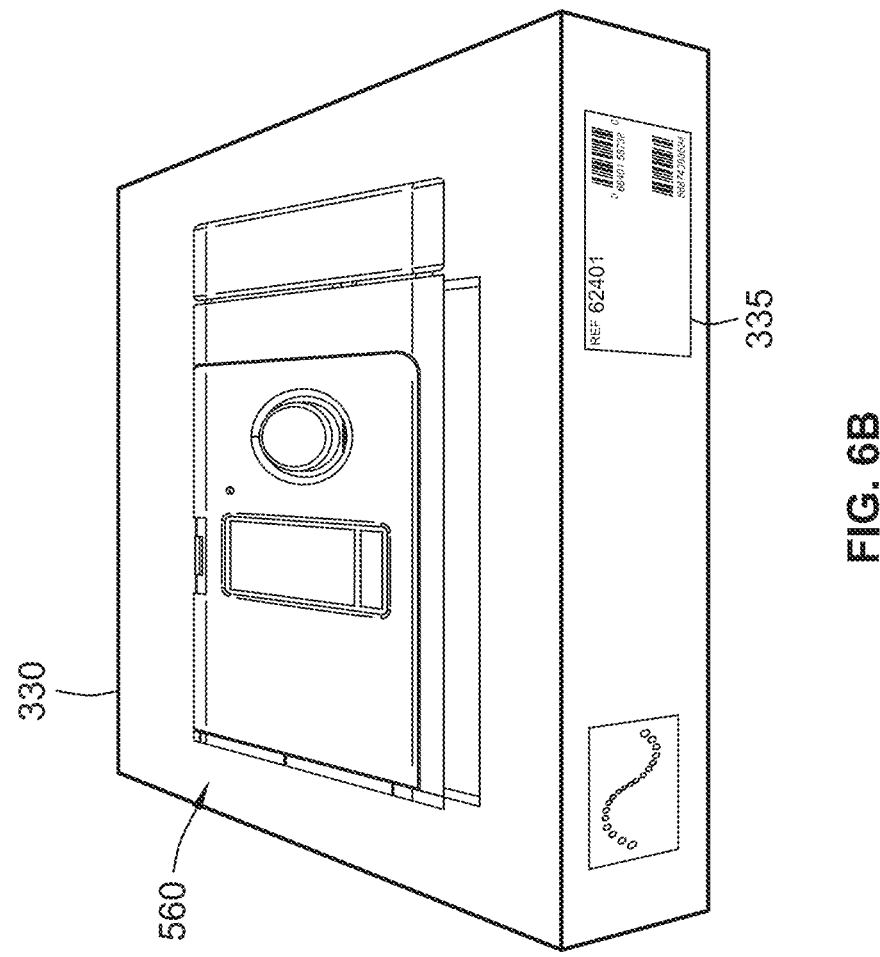
FIG. 6B illustrates the second inner container including a second portion of the respiratory therapy system, according to some implementations of the present disclosure.

FIG. 6A illustrates a physical representation of the first inner container 320 when it is removed from the outer container 300. The first inner container 320 as delivered to the patient 210 includes the first inner label 325 and an image of an assembled user interface 500 on adjacent sides. FIG. 6B illustrates a physical representation of the second inner container 330) when it is removed from the outer container 300. The second inner container 330 as delivered to the patient 210 includes the second inner label 335 and an image of an assembled respiratory therapy assembly 560 on adjacent sides.

Figure 7A:
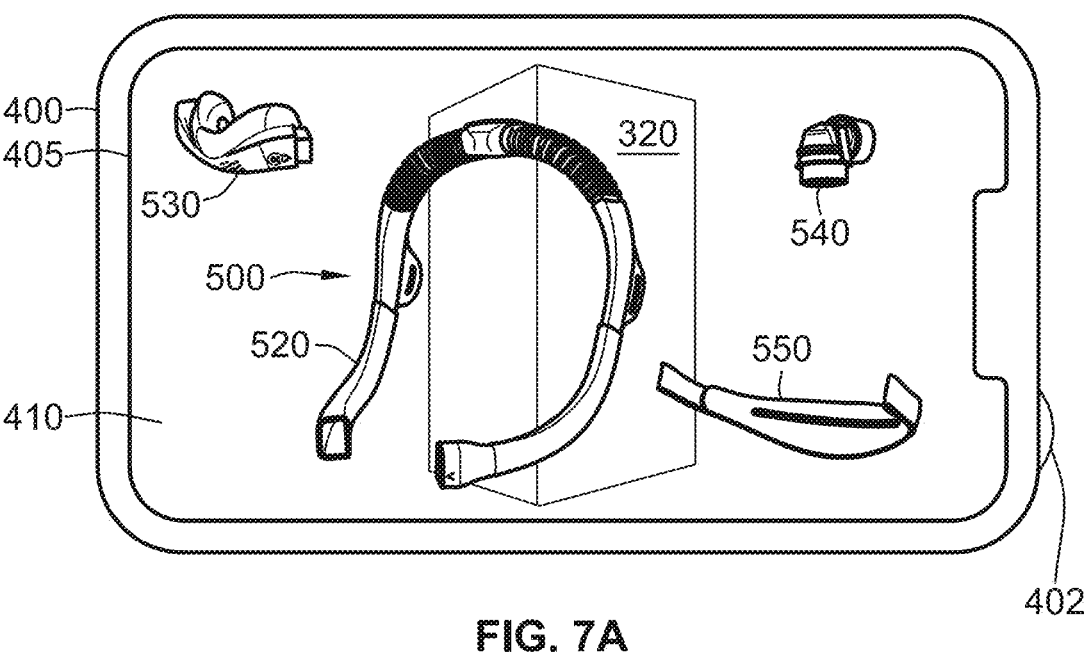
FIG. 7A illustrates an augmented reality image of the contents of the first inner container as seen on the display device, according to some implementations of the present disclosure.

FIG. 7A illustrates an augmented real-time video feed or image of the contents of the first inner container 320 as seen on the graphical interface 410 of the display device 405. The contents of the first inner container 320 include a three-dimensional representation of the headgear conduit 520, the cushion 530, the connector 540, and the headgear strap 550 in the foreground with an image of the first inner container 320 in the background. In some implementations, the augmented real-time video feed may separately indicate parts of the contents of the first inner container 320 that are used in the assembly process and parts that are not used in assembling the contents of the first inner container 320 such as, but not limited to, packaging and binding materials.

Figure 7B:
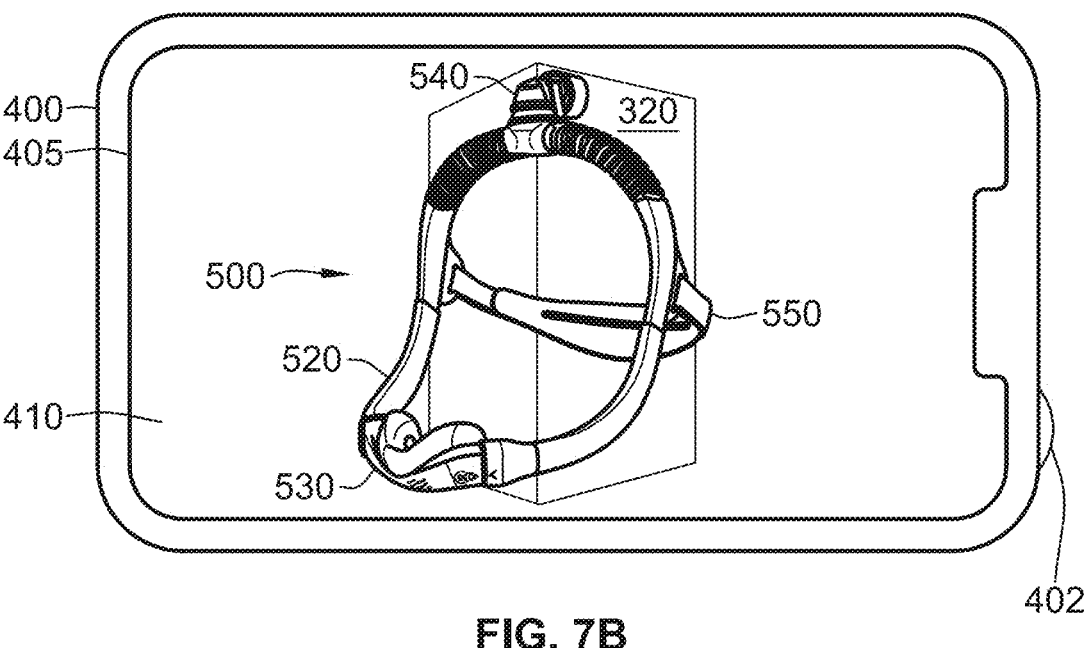
FIG. 7B illustrates an augmented reality image of the contents of the first inner container in an assembled form as seen on the display device, according to some implementations of the present disclosure.

Each of the contents of the first inner container 320 as shown in the three-dimensional representation can be explored further by clicking on the respective part of the three-dimensional representation and/or rotating and moving them by swiping on the display device 405. The contents of the first inner container 320 may also be moved within the three-dimensional representation to demonstrate how the contents are assembled to form the user interface 500) or what the user interface 500 looks like in assembled form. FIG. 7B illustrates an augmented reality image of the contents of the first inner container 320 in assembled form as the user interface 500 as seen on the graphical interface 410 of the display device 405.

Figure 8A:
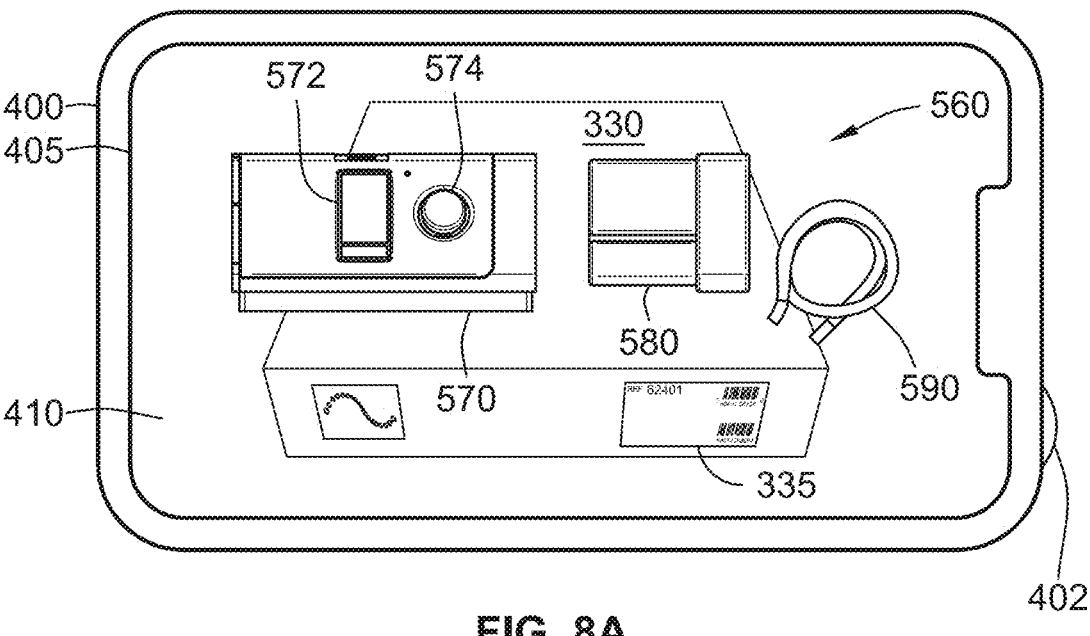
FIG. 8A illustrates an augmented reality image of the contents of the second inner container as seen on the display device, according to some implementations of the present disclosure.
Figure 8B:
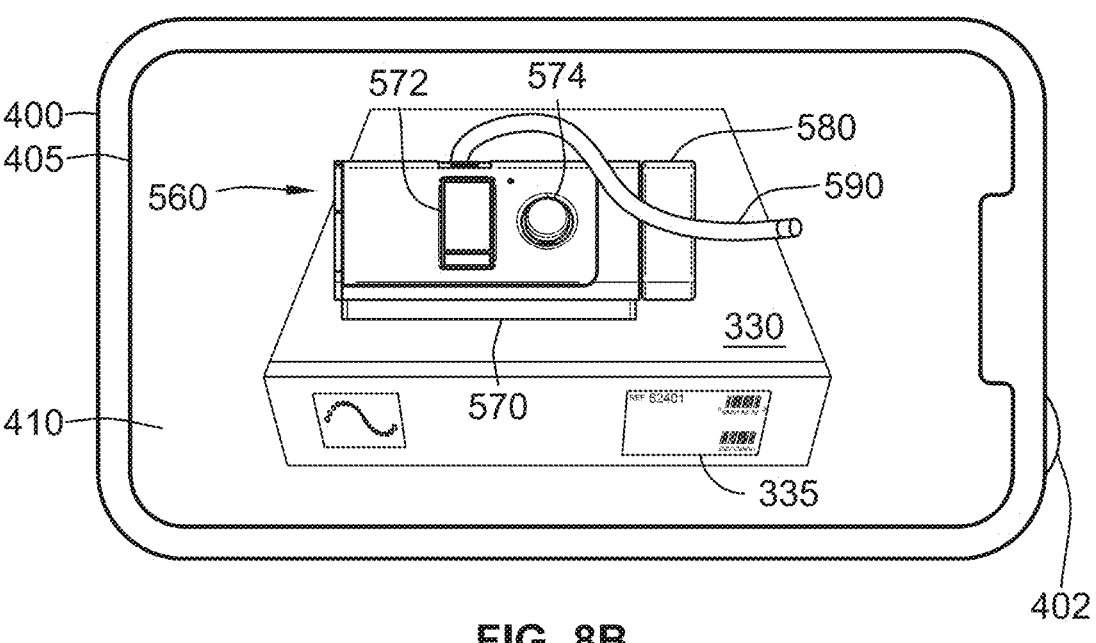
FIG. 8B illustrates an augmented reality image of the contents of the second inner container in an assembled form as seen on the display device, according to some implementations of the present disclosure.

FIG. 8A illustrates an augmented real-time video feed or image of the contents of the second inner container 330 as seen on the graphical interface 410 of the display device 405. The contents of the second inner container 330 include a three-dimensional representation of the respiratory therapy device 570, the humidification tank 580, and the conduit 590 in the foreground with an image of the second inner container 330 in the background. In some implementations, the augmented real-time video feed may separately indicate parts of the contents of the second inner container 330 that are used in the assembly process and parts that are not used in assembling the contents of the second inner container 330 such as, but not limited to, packaging and binding materials.

Each of the contents of the second inner container 330 as shown in the three-dimensional representation can be explored further by clicking on the respective part of the three-dimensional representation and/or rotating and moving them by swiping on the display device 405. The contents of the second inner container 330 may also be moved within the three-dimensional representation to demonstrate how the contents are assembled to form the respiratory therapy assembly 560 or what the respiratory therapy assembly 560 looks like in assembled form. FIG. 7B illustrates an augmented reality image of the contents of the second inner container 330 in assembled form as the respiratory therapy assembly 560 as seen on the graphical interface 410 of the display device 405.

FIGS. 9A-9F illustrate augmented reality images of an assembly process of the contents of the first inner container 320 and the second inner container 330 forming the respiratory therapy system 120 as seen on the display device 405. In some implementations, the assembly process for the respiratory therapy system 120 may occur automatically subsequent to the augmented displays of the contents of the first inner container 320 and the second inner container 330 shown in FIGS. 7A-8B. In other implementations, the patient 210 may be prompted to view the assembly process through an audio alert, a video alert, text alert, or a user-selectable element (as seen and described above with respect to FIGS. 5C-5D) on the display device 405, or any combination thereof. The assembly process is illustrated once the patient 210 provides an input in response to the prompt indicating a desire to view the assembly process.

The assembly process shown in FIGS. 9A-9F may be illustrated as a series of discrete images or as a continuous stream of images on the graphical interface 410. In some implementations such as shown in FIGS. 9A-9F, the illustration of the assembly process begins with the assembly process of the user interface 500 followed by the assembly process of the respiratory therapy assembly 560 to form the respiratory therapy system 120. In other implementations, the illustration of the assembly process may begin with the assembly process of the respiratory therapy assembly 560 followed by the assembly process of the user interface 500 to form the respiratory therapy system 120.

Figures 9A, 9B, 9C:
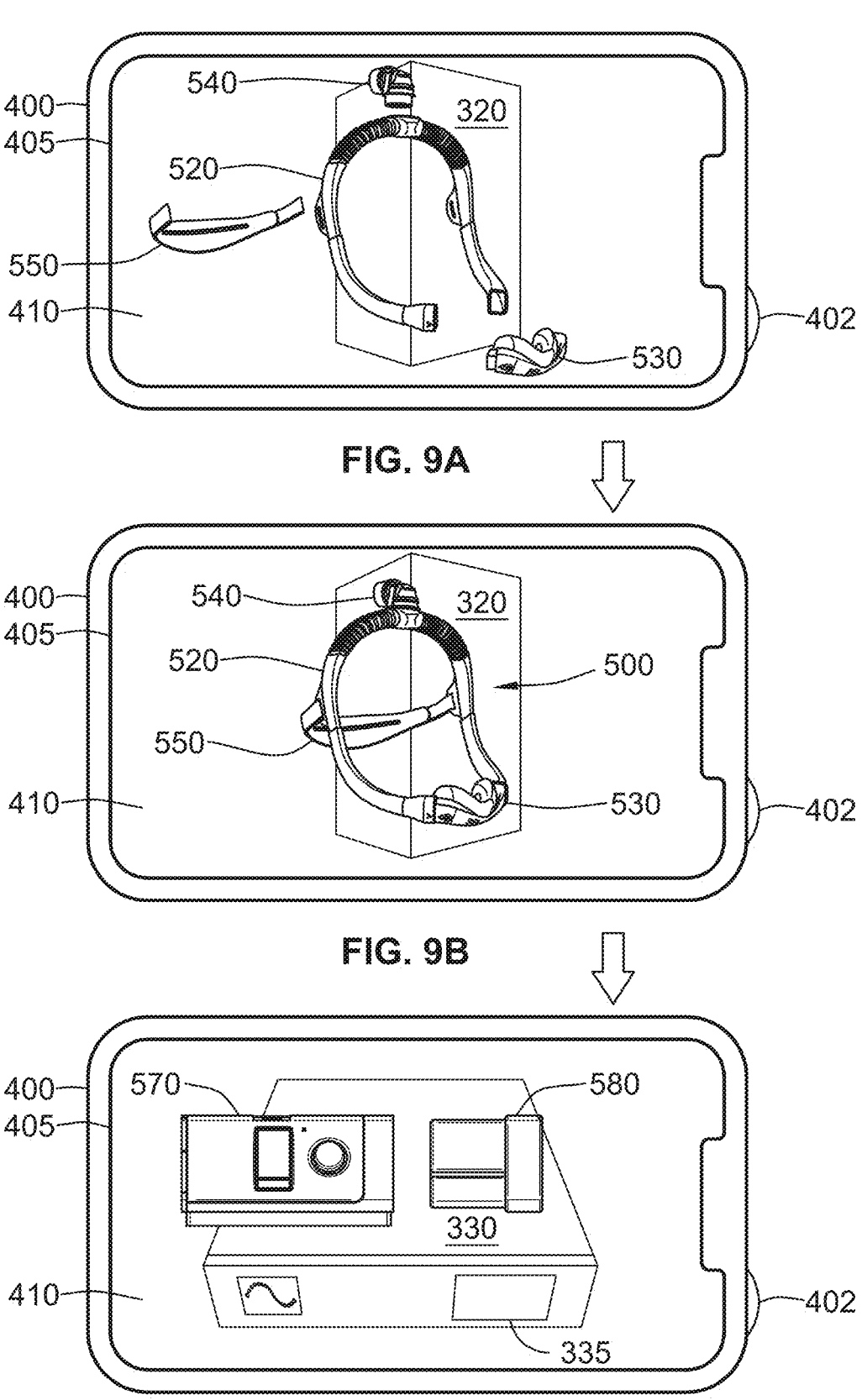
FIG. 9A illustrates a three-dimensional augmented representation of the contents of the first inner container, as seen on the display device, the first container forming with the second container the respiratory therapy system as seen on the display device, according to some implementations of the present disclosure.
FIG. 9B illustrates a three-dimensional augmented representation of the contents of the first inner container in assembled form, as seen on the display device, according to some implementations of the present disclosure.
FIG. 9C illustrates a three-dimensional augmented representation of the contents of the second inner container, as seen on the display device, according to some implementations of the present disclosure.

FIG. 9A illustrates a three-dimensional augmented representation of the contents of the first inner container 320 on the graphical interface 410. The three-dimensional representation shows augmented three-dimensional images of the headgear conduit 520, the cushion 530, the connector 540), and the headgear strap 550 in the foreground with an image of the first inner container 320 in the background. The demonstration of the assembly process then proceeds to FIG. 9B, which illustrates a three-dimensional augmented representation of the contents of the first inner container 320 in assembled form as the user interface 500, as seen on the graphical interface 410 of the display device 405.

FIG. 9C illustrates a three-dimensional augmented representation of the contents of the second inner container 330 on the graphical interface 410. The three-dimensional representation shows augmented three-dimensional images of the respiratory therapy device 570 and the humidification tank 580 in the foreground with an image of the second inner container 330 in the background. The demonstration of the assembly process then proceeds to FIG. 9D, which illustrates a three-dimensional augmented representation of the respiratory therapy device 570) and the humidification tank 580 in assembled form, as seen on the graphical interface 410 of the display device 405.

Figures 9D, 9E, 9F:
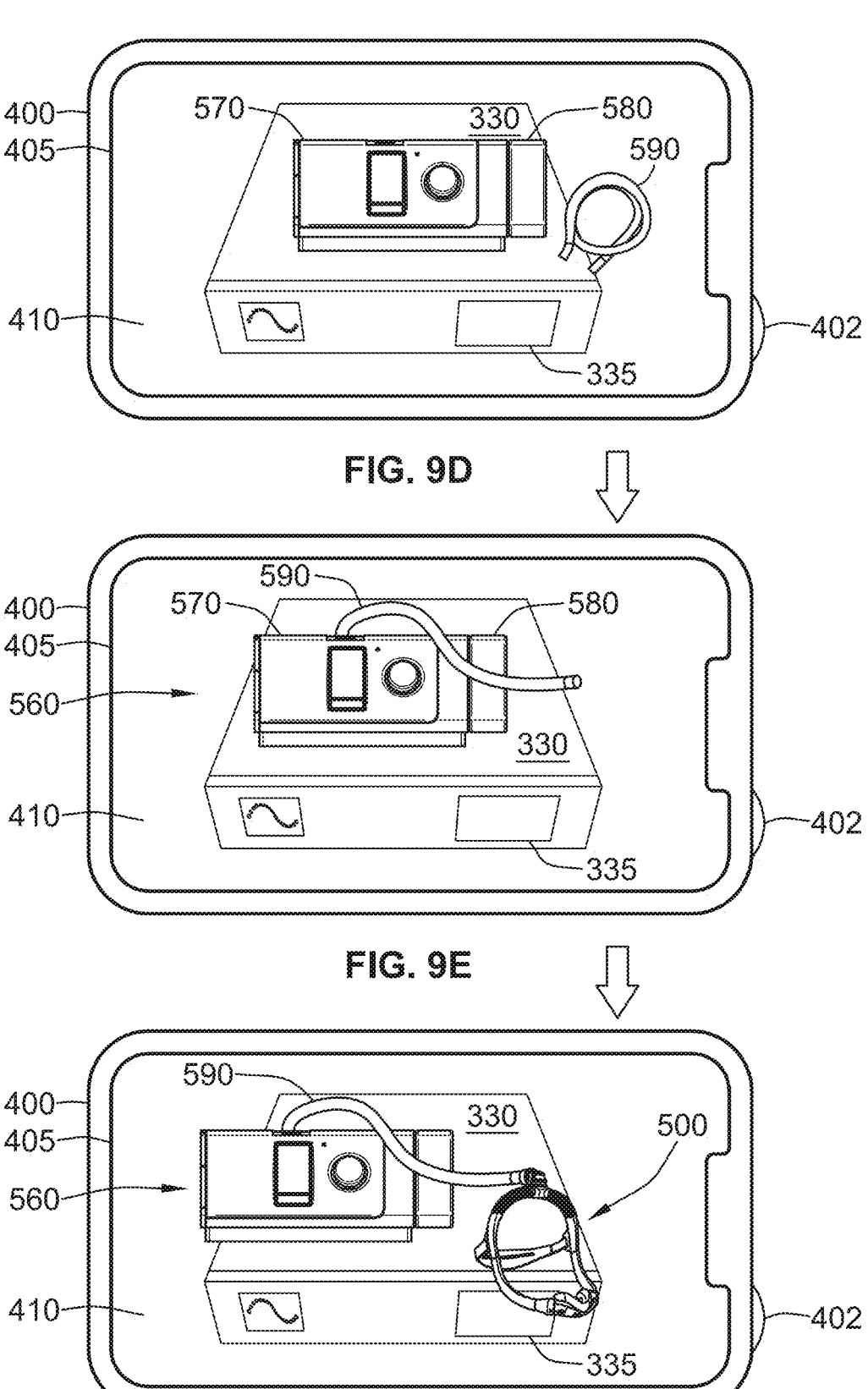
FIG. 9D illustrates a three-dimensional augmented representation of a respiratory therapy device and a humidification tank in assembled form, as seen on the display device, according to some implementations of the present disclosure.
FIG. 9E illustrates a three-dimensional augmented representation of a conduit connected to a respiratory therapy device to form the respiratory therapy system, as seen on the display device, according to some implementations of the present disclosure.
FIG. 9F illustrates a three-dimensional augmented representation of the user interface connected to a respiratory therapy assembly via the conduit to form the respiratory therapy system, as seen on the display device, according to some implementations of the present disclosure.

The demonstration of the assembly process then moves to FIG. 9E, which illustrates a three-dimensional augmented representation of the conduit 590 connected to the respiratory therapy device 570 to form the respiratory therapy assembly 560, as seen on the graphical interface 410 of the display device 405. As a last step of the assembly process, FIG. 9F illustrates a three-dimensional augmented representation of the user interface 500 connected to the respiratory therapy assembly 560 via the conduit 590 to form the respiratory therapy system 120. The demonstration then proceeds to show a three-dimensional augmented representation of the assembled user interface 500 of the respiratory therapy system 120 fitted over the head of the patient 210.

As noted above, the above illustrations of the contents of the first inner container 320 and the second inner container 330 as well as demonstration of the assembly process of the first inner container 320 and the second inner container 330 are described with regard to a situation where the first inner container 320 and the second inner container 330 are at least partially removed from the outer container 300, as shown in FIG. 4B. Such implementations follow the steps of the method 1100, shown in the block diagram of FIG. 11. Additionally, or alternatively, in some implementations, information about the contents of the first inner container 320 and the second inner container 330 may be retrieved without removing them from the outer container 300 or opening the outer container 300, as shown in FIG. 4A. FIG. 4A illustrates a real-time video feed on the display device 405 when the outer label 310 of the outer container 300 is scanned, without opening the outer container 300. Such implementations follow the steps of the method 1200 described and shown with regard to FIG. 12.

The method 1200 starts in step 1202 with the processor in the mobile device 400 receiving image data associated with a real-time video feed of the outer container 300 having the outer label 310 disposed thereon. Then in step 1204, the processor in the mobile device 400 identifies the outer label 310 in the real-time video feed by analyzing the received image data. Subsequently in step 1206, the processor in the mobile device 400 determines information associated with contents of the outer container 300 by analyzing the identified outer label 310. In the implementation shown in FIG. 4A, the outer container 300 includes a plurality of inner containers such as, but not limited to, the first inner container 320 and the second inner container 330, which contain portions of the respiratory therapy system 120. The information associated with the contents of the outer container 300 may be customized for the patient 210 based on either an expected use location or the current location of the respiratory therapy system 120 packaged within the outer container 300.

In step 1208, at least a portion of the real-time video feed of the outer container 300 is displayed on the display device 405, as shown in FIG. 4A. Subsequently, in step 1210, the real-time video feed of the outer container 300 is augmented based at least in part on the information associated with the contents of the outer container 300. In the implementation shown in FIG. 4A, when the outer label 310 is scanned, the graphical interface 410 appears on the display device 405. In some implementations, the real-time video feed may include an animation showing the first inner container 320 and the second inner container 330 emerging from the outer container 300, where the first inner container 320 and the second inner container 330 are distinctly highlighted, for example with red and blue shading and/or bordering respectively. In some implementations, the augmented real-time video feed may separately indicate parts of the contents of the outer container 300, the first inner container 320, and the second inner container 330 that are used in the assembly process of the respiratory therapy system 120 and parts that are unusable in the assembly process such as, but not limited to, packaging and binding materials.

In step 1212, a first user-selectable element associated with the first inner container 320 and a second user-selectable element associated with the second inner container 330 is displayed on the display device 405. In the implementation shown in FIG. 4A, the graphical interface 410 highlights the outer label 310 in the outer container 300 and shows the following user-selectable elements to the patient 210: "Box 1 Contents" element 412*a*. "Box 1 information" element 414*a*. "Box 2 Contents" element 416*a*, and "Box 2 Information" element 418*a*. In different implementations, the graphical interface 410) may use an audio alert, a video alert, a text alert, or any combination thereof, to prompt the patient 210 to receive more information on the contents of the outer container 300.

In step 1214, the displayed real-time video feed of the outer container 300 is augmented to virtually illustrate at least a portion of the contents of the first inner container 320, in response to the patient 210) selecting either the "Box 1 Contents" element 412*a*, or the "Box 1 information" element 414*a*. If the patient 210 selects the element 412*a*, the graphical interface 410 proceeds to a screen as shown and described above with respect to FIG. 5A. If the patient 210 selects the element 414*a*, the graphical interface 410 proceeds to a screen as shown and described above with respect to FIG. 5C.

In step 1216, the displayed real-time video feed of the outer container 300 is augmented to virtually illustrate at least a portion of the contents of the second inner container 330, in response to the patient 210) selecting either the "Box 2 Contents" element 416*a*, or the "Box 2 information" element 418*a*. If the patient 210 selects the element 416*a*, the graphical interface 410 proceeds to a screen as shown and described above with respect to FIG. 5B. If the patient 210 selects the element 414*a*, the graphical interface 410 proceeds to a screen as shown and described above with respect to FIG. 5D.

Figure 10:
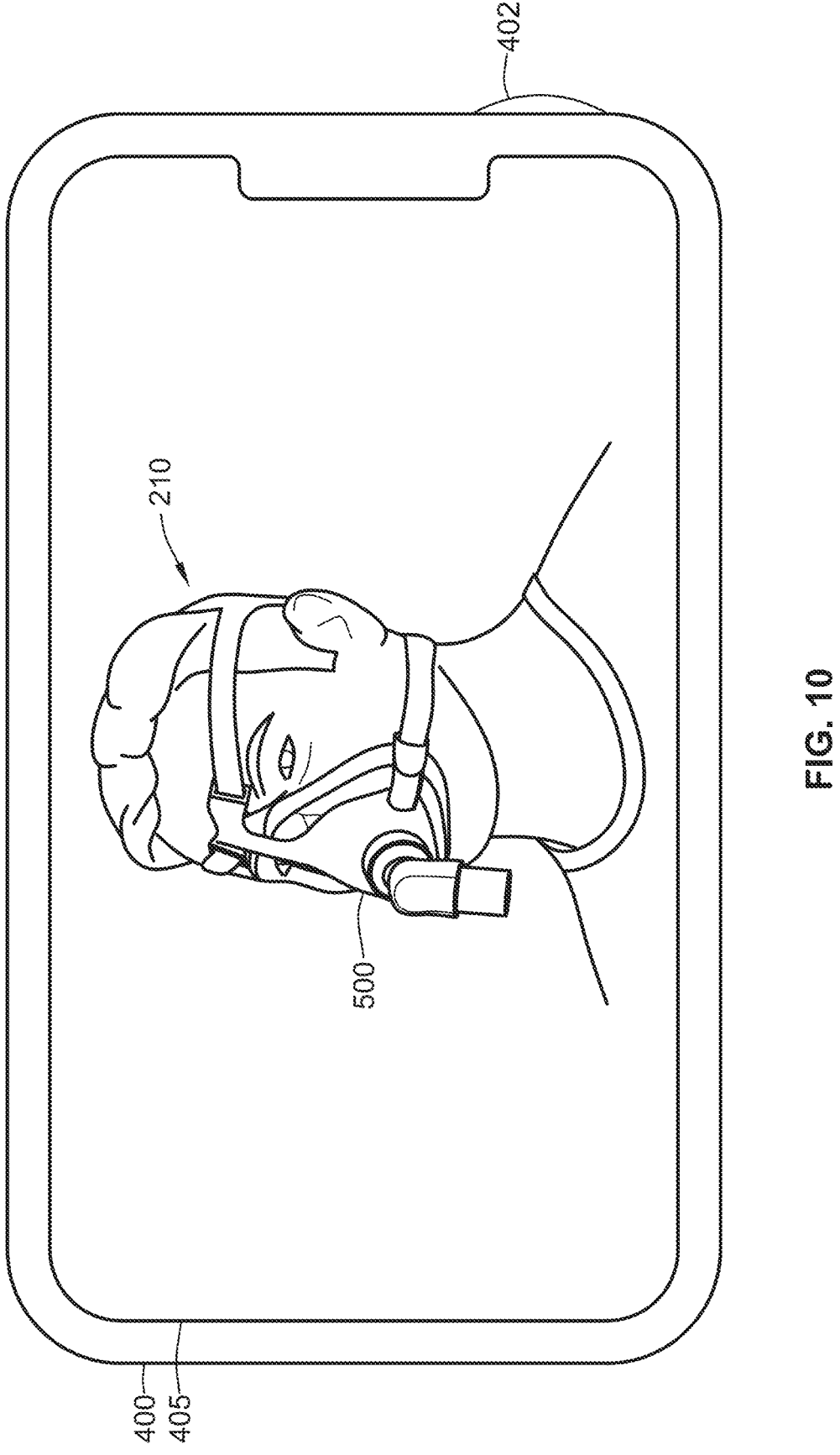
FIG. 10 illustrates an augmented reality image of the assembled respiratory therapy system fitted on a patient's head, according to some implementations of the present disclosure.

Subsequently, in some implementations, the graphical interface 410 may proceed to automatically demonstrate, through augmented reality images, an assembly process of the contents of the first inner container 320 and the second inner container 330 forming the respiratory therapy system 120. In other implementations, the patient 210 may be prompted to view the assembly process through an audio alert, a video alert, text alert, or a user-selectable element (as seen and described above with respect to FIGS. 5C-5D) on the display device 405, or any combination thereof. The assembly process is illustrated once the patient 210 provides an input in response to the prompt indicating a desire to view the assembly process. The assembly process is shown and described above with regard to FIGS. 9A-9F. Subsequent to the demonstration of the assembly process, the graphical interface 410 proceeds to show a three-dimensional augmented representation of the assembled user interface 500 of the respiratory therapy system 120 fitted over the head of the patient 210, as shown in FIG. 10.

While the method 1100 and the method 1200 have been shown and described herein as occurring in a certain order, more generally, the steps therein can be performed in any suitable order. Further, the method 1100 and the method 1200 are representative of example computer readable instructions comprising an algorithm executed by a controller, such as the processor 112. The algorithm may be embodied in software stored on tangible media such as a flash memory, a CD-ROM, a floppy disk, a hard drive, a digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces can be implemented by software, hardware, and/or firmware. Also, some or all of the computer readable instructions represented by the methods 1100, 1200 of FIGS. 11 and 12, respectively, may be implemented manually. Further, although the example algorithm is described with reference to the methods 1100, 1200 illustrated in FIGS. 11 and 12 respectively, persons of ordinary skill in the art will readily appreciate that many other methods of implementing the example machine-readable instructions may alternatively be used.

The systems and methods described herein can be advantageously used to educate and inform patients about the respiratory therapy system packaged in containers that are delivered to them. The systems and methods leverage augmented reality technology to display interactive information to the patients. The information about the components of the respiratory therapy system as well as the assembly process of the components provides the patients an easy and instant guide to the respiratory therapy system, without spending large amounts of time speaking to a virtual coach over the phone. The use of augmented reality technology reduces that time by engaging with the patients directly such that they can comprehend the information in a manner and order of their choice. As a result, the patients/user can be more efficient in setting up the respiratory therapy system remotely.

One or more elements or aspects or steps, or any portion(s) thereof, from one or more of any of the claims below can be combined with one or more elements or aspects or steps, or any portion(s) thereof, from one or more of any of the other claims below , to form one or more additional implementations and/or claims of the present disclosure.

While the present disclosure has been described with reference to one or more particular implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

The invention claimed is:
1. A method comprising:
   receiving first image data associated with a first real-time video feed of an outer container having an outer label thereon;
   identifying the outer label in the first real-time video feed by analyzing the received first image data;

determining first information associated with contents of the outer container by analyzing the identified outer label, the first information including digital information about the contents of the outer container;

displaying, via a display device in the form of a mobile device, at least a portion of the first real-time video feed of the outer container and a first graphical interface including a first plurality of user-selectable elements associated with (i) the contents of the outer container, and (ii) the digital information about the contents of the outer container; and displaying, via the mobile device, a virtual illustration of at least a portion of the contents of the outer container.

2. The method of claim 1, wherein the contents of the outer container include a first inner container and a second inner container, and wherein the at least a portion of the contents of the outer container includes contents of the first inner container, or contents of the second inner container.

3. The method of claim 1, wherein the contents of the outer container include a first inner container and a second inner container, and further comprising receiving second image data associated with a second real-time video feed of the first inner container subsequent to the first inner container being at least partially removed from the outer container, the first inner container having a first inner label thereon.

4. The method of claim 3, further comprising:

identifying the first inner label in the second real-time video feed by analyzing the received second image data; and determining second information associated with contents of the first inner container by analyzing the identified first inner label, the second information including digital information about the contents of the first inner container, the contents of the first inner container including a first portion of a respiratory therapy system.

5. The method of claim 4, further comprising:

displaying, via the display device, a virtual illustration of at least a portion of the contents of the first inner container, and a second graphical interface including a second plurality of user-selectable elements associated with (i) the digital information about the contents of the first inner container, (ii) the contents of the second inner container.

6. The method of claim 5, further comprising receiving third image data associated with a third real-time video feed of the second inner container subsequent to the second inner container being at least partially removed from the outer container, the second inner container having a second inner label thereon.

7. The method of claim 6, further comprising:

identifying the second inner label in the third real-time video feed by analyzing the received third image data; and determining third information associated with contents of the second inner container by analyzing the identified second inner label, the third information including digital information about the contents of the second inner container, the contents of the second inner container including a second portion of the respiratory therapy system.

8. The method of claim 7, further comprising:

displaying, via the display device, a virtual illustration of at least a portion of the contents of the second inner container, and a third graphical interface including a third plurality of user-selectable elements associated with (i) the digital information about the contents of the first inner container, (ii) the contents of the first inner container, and (ii) the digital information about the contents of the second inner container.

9. The method of claim 8, further comprising displaying, via the display device, a virtual illustration of an assembly process for at least the first portion of the respiratory therapy system.

10. The method of claim 9, wherein the assembly process includes:

putting together the first portion of the respiratory therapy system with the contents of the first inner container;

putting together the second portion of the respiratory therapy system with the contents of the second inner container; and connecting the first portion of the respiratory therapy system with the second portion of the respiratory therapy system using a conduit.

11. The method of claim 10, wherein the conduit is included in a third inner container within the outer container.

12. The method of claim 9, further comprising illustrating, via the display device, the at least a portion of the assembled respiratory therapy system being coupled to an exemplary virtual user.

13. The method of claim 12, wherein the at least a portion of the assembled respiratory therapy system includes a user interface.

14. The method of claim 8, further comprising displaying, via the display device, a virtual illustration of an assembly process for the respiratory therapy system.

15. The method of claim 14, wherein the displaying of the assembly process for the respiratory therapy system occurs automatically subsequent to the displaying of the virtual illustration of the at least a portion of the contents of the first inner container and the displaying of the virtual illustration of the at least a portion of the contents of the second inner container.

16. A system comprising:

an outer container with an outer label thereon, the outer container having a first inner container with a first inner label and at least a second inner container with a second inner label;

a memory storing machine-readable instructions; and a control system including one or more processors configured to execute the machine-readable instructions to:

receive first image data associated with a first real-time video feed of the outer container;

identify the outer label in the first real-time video feed by analyzing the received first image data;

determine first information associated with contents of the outer container by analyzing the identified outer label, the first information including digital information about the contents of the outer container;

display, via a display device in the form of a mobile device, at least a portion of the first real-time video feed of the outer container and a first graphical interface including a first plurality user-selectable elements associated with (i) the contents of the outer container, and (ii) the digital information about the contents of the outer container;

receive second image data associated with a second real-time video feed of the first inner container and third image data associated with a third real-time video feed of the second inner container subsequent to the first inner container and the second inner container being at least partially removed from the outer container;

identify the first inner label in the second real-time video feed by analyzing the received second image data and the second inner label in the third real-time video feed by analyzing the received third image data;

determine second information associated with contents of the first inner container by analyzing the identified first inner label, the second information including digital information about the contents of the first inner container, the contents of the first inner container including a first portion of a respiratory therapy system;

determine third information associated with contents of the second inner container by analyzing the identified second inner label, the third information including digital information about the contents of the second inner container, the contents of the second inner container including a second portion of the respiratory therapy system;

display, via the display device, a virtual illustration of at least a portion of the contents of the first inner container, and a second graphical interface including a second plurality user-selectable elements associated with (i) the digital information about the contents of the first inner container, (ii) the contents of the second inner container, and (ii) the digital information about the contents of the second inner container;

display, via the display device, a virtual illustration of at least a portion of the contents of the second inner container, and a third graphical interface including a third plurality user-selectable elements associated with (i) the digital information about the contents of the first inner container, (ii) the contents of the first inner container, and (ii) the digital information about the contents of the second inner container; and display, via the display device, a virtual illustration of an assembly process for at least a portion of the respiratory therapy system.

17. The system of claim 16, wherein the first portion of the respiratory therapy system includes at least a portion of a user interface of the respiratory therapy system.

18. The system of claim 16, wherein the second portion of the respiratory therapy system includes at least a portion of a respiratory therapy device of the respiratory therapy system.

19. The system of claim 16, wherein the displaying of the assembly process for the at least the first portion of the respiratory therapy system occurs automatically after the virtual illustration of the at least a portion of the contents of the first inner container is displayed.

20. The system of claim 16, wherein the control system including one or more processors configured to execute the machine-readable instructions to display, via the display device, the at least a portion of the assembled respiratory therapy system being coupled to an exemplary virtual user.

* * * * *